(12) United States Patent
Kido et al.

(10) Patent No.: US 10,829,655 B2
(45) Date of Patent: *Nov. 10, 2020

(54) INK, SET OF INK AND SUBSTRATE, INK-JET PRINTING METHOD, INK-JET PRINTER, AND PRINT

(71) Applicant: RICOH COMPANY, LTD., Tokyo (JP)

(72) Inventors: Masahiro Kido, Kanagawa (JP); Juichi Furukawa, Kanagawa (JP); Hidefumi Nagashima, Kanagawa (JP); Yukihiro Imanaga, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/031,594

(22) Filed: Jul. 10, 2018

(65) Prior Publication Data

US 2018/0320011 A1 Nov. 8, 2018

Related U.S. Application Data

(63) Continuation of application No. PCT/JP2017/000329, filed on Jan. 6, 2017.

(30) Foreign Application Priority Data

Jan. 22, 2016 (JP) .................................. 2016-011064

(51) Int. Cl.
*C09D 11/38* (2014.01)
*B41J 2/01* (2006.01)
(Continued)

(52) U.S. Cl.
CPC ................ *C09D 11/38* (2013.01); *B41J 2/01* (2013.01); *B41M 5/00* (2013.01); *C09D 11/104* (2013.01); *C09D 11/322* (2013.01)

(58) Field of Classification Search
CPC . B41J 2/1433; B41J 2/16; B41J 2/1623; B41J 2202/00; B41J 2202/03;
(Continued)

(56) References Cited

U.S. PATENT DOCUMENTS

| 8,623,126 B1 * | 1/2014 | Brust ..................... C09D 11/38 106/31.65 |
| 8,883,275 B2 | 11/2014 | Nagashima et al. |

(Continued)

FOREIGN PATENT DOCUMENTS

| JP | 2001-232727 | 8/2001 |
| JP | 2004-531416 | 10/2004 |

(Continued)

OTHER PUBLICATIONS

Office Action dated May 14, 2019 in corresponding Japanese Patent Application No. 2017-562512, 5 pages.

(Continued)

*Primary Examiner* — Manish S Shah
(74) *Attorney, Agent, or Firm* — Oblon, McClelland, Maier & Neustadt, L.L.P.

(57) ABSTRACT

Provided is an ink including water, organic solvents, a color material, and resin particles, wherein the ink is used in a printing method including applying the ink onto a substrate including a resin to print, and the organic solvents include a compound, a diol compound including 3 or 4 carbon atoms, and 2-ethylhexyl alcohol, where the compound has a boiling point of 170° C. or higher and an absolute value of a difference between Fh of the compound represented by Mathematical Formula 1 and Fh of the resin in the substrate represented by Mathematical Formula 1 is 5% or less, $$Fh(\%)=[\delta H/(\delta D+\delta P+\delta H)]\times 100 \quad \text{<Mathematical Formula 1>}$$

where, in Mathematical Formula 1, $\delta H$ is a hydrogen bond term of the Hansen solubility parameter, $\delta D$ is a dispersion (Continued)

term of the Hansen solubility parameter, and δP is a polarity term of the Hansen solubility parameter.

12 Claims, 3 Drawing Sheets

(51) Int. Cl.
*B41M 5/00* (2006.01)
*C09D 11/104* (2014.01)
*C09D 11/322* (2014.01)

(58) Field of Classification Search
CPC .... B41J 2/14201; B41J 2/045; B41J 2/04588; B41J 2/04595; B41J 2/04586; B41J 2/14274; B41J 11/0015; B41J 11/002; B41J 2/01; B41J 2/211; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/2012; B41J 2/04598; B41J 3/4078; B41J 29/377; B41M 5/0011; B41M 5/0017; B41M 5/0047; B41M 7/00; B41M 7/0072; B41M 5/52; B41M 5/5218; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B65H 23/26; B65H 2404/14211; D09P 5/001; D06B 19/0076
See application file for complete search history.

(56) References Cited

U.S. PATENT DOCUMENTS

| | | | |
|---|---|---|---|
| 8,899,719 B2 | 12/2014 | Nagashima et al. | |
| 9,108,439 B2 | 8/2015 | Toda et al. | |
| 9,163,160 B2 | 10/2015 | Toda et al. | |
| 9,243,158 B2 | 1/2016 | Toda et al. | |
| 9,284,464 B2 | 3/2016 | Nagashima et al. | |
| 9,321,923 B2 | 4/2016 | Nakagawa et al. | |
| 9,340,692 B2 | 5/2016 | Nakagawa et al. | |
| 9,358,810 B2 | 6/2016 | Fujii et al. | |
| 9,446,606 B2 | 9/2016 | Fujii et al. | |
| 10,519,331 B2 * | 12/2019 | Kido | C09D 11/322 |
| 2005/0176847 A1 | 8/2005 | Cagle | |
| 2007/0060670 A1 * | 3/2007 | Ellis | C09D 11/322 523/160 |
| 2013/0071535 A1 * | 3/2013 | Fenyvesi | C09D 11/03 426/534 |
| 2013/0344306 A1 | 12/2013 | Arai et al. | |
| 2015/0017396 A1 | 1/2015 | Nakagawa et al. | |
| 2015/0050467 A1 | 2/2015 | Nakagawa et al. | |
| 2015/0191614 A1 | 7/2015 | Nagashima et al. | |
| 2015/0258783 A1 | 9/2015 | Toda et al. | |
| 2015/0329731 A1 | 11/2015 | Fujii et al. | |
| 2015/0361282 A1 | 12/2015 | Nakagawa et al. | |
| 2015/0361285 A1 * | 12/2015 | Breton | C09D 11/38 347/20 |
| 2015/0368492 A1 | 12/2015 | Fujii et al. | |
| 2016/0032122 A1 | 2/2016 | Toda et al. | |
| 2016/0068697 A1 | 3/2016 | Toda et al. | |
| 2016/0102220 A1 | 4/2016 | Kido et al. | |
| 2016/0264808 A1 | 9/2016 | Kido et al. | |
| 2016/0355695 A1 | 12/2016 | Nakagawa et al. | |
| 2017/0015102 A1 | 1/2017 | Nagashima et al. | |

FOREIGN PATENT DOCUMENTS

| | | | |
|---|---|---|---|
| JP | 2005-220352 | 8/2005 | |
| JP | 2010-248357 | 11/2010 | |
| JP | 2011-094082 | 5/2011 | |
| JP | 2011-201230 | 10/2011 | |
| JP | 2012-224044 | 11/2012 | |
| JP | 2014-004742 | 1/2014 | |
| JP | 2015-034268 | 2/2015 | |
| JP | 2015-205469 | 11/2015 | |
| JP | 2016-003337 | 1/2016 | |
| JP | 2016-169370 | 9/2016 | |
| WO | WO 2003/002352 A1 | 1/2003 | |
| WO | WO-2009034394 A1 * | 3/2009 | C09D 11/36 |

OTHER PUBLICATIONS

International Search Report dated Mar. 7, 2017 for counterpart International Patent Application No. PCT/JP2017/000329 filed Jan. 6, 2017 (with English Translation).
Written Opinion dated Mar. 7, 2017 for counterpart International Patent Application No. PCT/JP2017/000329 filed Jan. 6, 2017.
Toshikatsu Kobayashi, Evaluation of Affinity—Solubility Parameter—, Instrumentation (Measurement) Course (Lesson XIV) Color Materials, 2004, 77 [4], 188-192 (with English Abstract).

* cited by examiner ial No. PCT/JP2017/000329, filed
INK, SET OF INK AND SUBSTRATE, INK-JET PRINTING METHOD, INK-JET PRINTER, AND PRINT

CROSS-REFERENCE TO RELATED APPLICATIONS

The present application is a continuation application of International Application No. PCT/JP2017/000329, filed Jan. 6, 2017, which claims priority to Japanese Patent Application No. 2016-011064, filed Jan. 22, 2016. The contents of these applications are incorporated herein by reference in their entirety.

BACKGROUND OF THE INVENTION

Field of the Invention

The present disclosure relates to an ink, a set of an ink and a substrate, an ink-jet printing method, an ink-jet printer, and a print.

Description of the Related Art

Impermeable substrates such as plastic films are used for industrial purposes such as advertisements and signs in order to improve durability such as light resistance, water resistance, and wear resistance. There have been developed various inks intended for use on the impermeable substrates.

Widely used among such inks are solvent-based inks using an organic solvent as a vehicle and ultraviolet-curable inks mainly made of a polymerizable monomer. However, there are concerns that the solvent-based inks may become hazardous to the environment through solvent vaporization. The ultraviolet-curable inks may be limited in selection of polymerizable monomers to be used in terms of safety.

Hence, there have been proposed water-based inks that are lowly environmentally hazardous and can be recorded directly over impermeable substrates (see, e.g., Japanese Unexamined Patent Application Publication No. 2005-220352 and Japanese Unexamined Patent Application Publication No. 2011-094082).

SUMMARY OF THE INVENTION

According to one aspect of the present disclosure, an ink includes water, organic solvents, a color material, and resin particles. The ink is used in a printing method including applying the ink onto a substrate including a resin to perform printing, and the organic solvents include a compound, a diol compound including 3 or 4 carbon atoms, and 2-ethylhexyl alcohol, where the compound has a boiling point of 170° C. or higher and an absolute value of a difference between a ratio Fh of the compound represented by Mathematical Formula 1 below and a ratio Fh of the resin in the substrate represented by Mathematical Formula 1 below is 5% or less, $$Fh(\%)=[\delta H/(\delta D+\delta P+\delta H)]\times 100 \qquad <\text{Mathematical Formula 1}>$$

where, in Mathematical Formula 1, $\delta H$ is a hydrogen bond term of the Hansen solubility parameter, $\delta D$ is a dispersion term of the Hansen solubility parameter, and $\delta P$ is a polarity term of the Hansen solubility parameter.

DESCRIPTION OF THE EMBODIMENTS (Ink)

Figure 1:
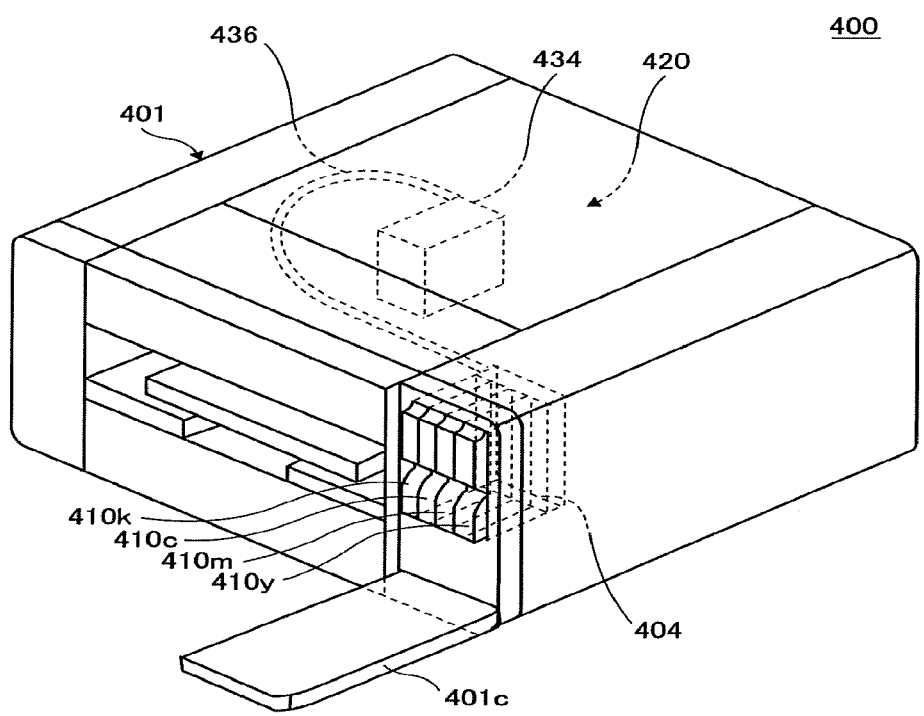
FIG. 1 is a perspective view illustrating one example of an ink-jet printing device.

An ink of the present disclosure is an ink used for printing method including applying the ink onto a substrate including a resin to perform printing. The ink includes water, organic solvents, a color material, and resin particles. The organic solvents include a compound, a diol compound including 3 or 4 carbon atoms, and 2-ethylhexyl alcohol. The compound has a boiling point of 170° C. or higher and an absolute value of a difference between a ratio Fh of the compound represented by Mathematical Formula 1 below and a ratio Fh of the resin in the substrate represented by Mathematical Formula 1 below is 5% or less. The ink may further include other components according to the necessity.

$$Fh(\%)=[\delta H/(\delta D+\delta P+\delta H)]\times 100 \qquad <\text{Mathematical Formula 1}>$$

In Mathematical Formula 1, $\delta H$ is a hydrogen bond term of the Hansen solubility parameter, $\delta D$ is a dispersion term of the Hansen solubility parameter, and $\delta P$ is a polarity term of the Hansen solubility parameter.

The present disclosure has an object to provide an ink having excellent fixability over impermeable substrate, an excellent high-speed printability, an excellent discharging reliability, and excellent scratch resistance.

The present disclosure can provide an ink having excellent fixability over impermeable substrate, an excellent high-speed printability, an excellent discharging reliability, and excellent scratch resistance.

The ink of the present disclosure has been accomplished based on insights that water-based inks available in the art do not satisfy all of performances of fixability over impermeable substrates, high-speed printability, discharging reliability, and scratch resistance.

Among components to be included in the ink, selection of the organic solvents influences ink fixability onto a substrate to be printed. Therefore, a function of the organic solvents playing is extremely large. The present inventors have found that fixability of an ink is significantly improved by adding, to the ink, a compound having Fh (a ratio of a hydrogen bond term $\delta H$ of the Hansen solubility parameter to a sum of the three Hansen solubility parameter components, i.e., a hydrogen bond term $\delta H$, a dispersion term $\delta D$, and a polarity term $\delta P$) close to Fh of a resin of a substrate used for printing. A reason therefor is not clear, but it is assumed that affinity between the substrate and the ink is enhanced by adding an organic solvent having Fh a difference of which to Fh of the substrate is within 5%. Since fixability of the ink onto a substrate is improved, a phenomenon (beading) where ink droplets next to each other are combined and shrank after landing can be suppressed even during high-speed printing and an image of high quality can be obtained. Moreover, it has been found that an improvement in fixing speed can increase improvement of secondary drying and transfer of the image to a back of paper at the time of winding the substrate after printing.

Moreover, it has been also found out that clogging near an edge of a nozzle of an ink-jet printer can be suppressed and high discharging reliability can be obtained because the organic solvents have relatively high boiling points. Furthermore, it has been found that, surprisingly, fastness of a coating film formed after printing can be significantly improved by adding certain amounts of the organic solvents.
<Organic Solvent>
The organic solvents include a compound, a diol compound including 3 or 4 carbon atoms, and 2-ethylhexyl alcohol, where the compound has a boiling point of 170° C. or higher and an absolute value of a difference between a ratio Fh of the compound represented by Mathematical Formula 1 below and a ratio Fh of the resin in the substrate represented by Mathematical Formula 1 below is 5% or less.

$Fh(\%)=[\delta H/(\delta D+\delta P+\delta H)]\times 100$      <Mathematical Formula 1>

In Mathematical Formula 1, $\delta H$ is a hydrogen bond term of the Hansen solubility parameter, $\delta D$ is a dispersion term of the Hansen solubility parameter, and $\delta P$ is a polarity term of the Hansen solubility parameter.

Hansen solubility parameters (HSP) are presentation of a solubility parameter introduced by Hildebrand in a three-dimensional space by means of division of the solubility parameter into three components including a dispersion term $\delta D$, a polarity term $\delta P$, and a hydrogen bond term $\delta H$. The dispersion term $\delta D$ represents an effect obtained from a dispersion force. The polarity term $\delta P$ represents an effect obtained from a dipole-dipole force. The hydrogen bond term $\delta H$ represents an effect obtained from a hydrogen bonding strength.

The definition and calculation of the Hansen solubility parameters (HSP) are described in a document identified below. Hansen, Charles M. *Hansen Solubility Parameters: A Users Handbook*, CRC Press, Inc., 2007.
B, John, *Solubility parameters: theory and application*, The Book and paper group annual Vol. 3, (1984)

Solubility parameters (HSP) [$\delta D$, $\delta P$, and $\delta H$] of a solvent can be easily estimated from a chemical structure of the solvent, using, for example, computer software HANSEN SOLUBILITY PARAMETERS IN PRACTICE (HSPIP). In the present disclosure, Hansen solubility parameters to be used for any solvent registered in a database of HSPIP version 3.0.38 are the values registered in the database, and Hansen solubility parameters to be used for any solvent that is not registered in the database are values estimated with HSPIP version 3.0.38.

It is possible to know characteristics of a solvent by calculating ratios (percentages) of the three solubility parameter components (dispersion term $\delta D$, polarity term $\delta P$, and hydrogen bond term $\delta H$) to the total solubility parameter as Fd, Fp, and Fh according to mathematical formulae 1 below and a mathematical formula 2 below.

$Fd(\%)=\delta D/(\delta D+\delta P+\delta H)\times 100$ $Fp(\%)=\delta P/(\delta D+\delta P+\delta H)\times 100$ $Fh(\%)=\delta H/(\delta D+\delta P+\delta H)\times 100$      <Mathematical formulae 1>

$Fd+Fp+Fh=100\%$      <Mathematical formula 2>

In the present disclosure, the organic solvents immediately permeate the substrate, especially an impermeable substrate, during a fixing step of the ink, when an image is printed on the substrate with the ink including a compound where the compound has a boiling point of 170° C. or higher and an absolute value of a difference between a ratio Fh (a ratio of a hydrogen bond term $\delta H$ of the Hansen solubility parameter to a sum of the three Hansen solubility parameter components, i.e., a hydrogen bond term $\delta H$, a dispersion term $\delta D$, a polarity term $\delta P$) of the compound represented by Mathematical Formula 1 and a ratio Fh of the resin in the substrate represented by Mathematical Formula 1 is 5% or less. As a result, fixing speed of the ink can be improved.

An absolute value of a difference between a ratio Fh of the organic solvent represented by Mathematical Formula 1 and a ratio Fh of a resin in a substrate used for printing represented by Mathematical Formula 1 is preferably 5% or less and more preferably 3% or less. When the absolute value of the difference of the Fh is 5% or less, there are advantages that even more excellent affinity between the ink and a substrate can be obtained and fixing speed of the ink can be further increased.

The compound where the compound has a boiling point of 170° C. or higher and an absolute value of a difference between a ratio Fh of the compound represented by Mathematical Formula 1 and a ratio Fh of the resin in the substrate represented by Mathematical Formula 1 is 5% or less is not particularly limited and may be appropriately selected depending on the intended purpose. Examples of the compound include 3-methoxy-N,N-dimethylpropionamide ($\delta H$: 4.1 MPa$^{1/2}$, Fh: 16%, boiling point: 216° C.), 3-butoxy-N,N-dimethylpropionamide ($\delta H$: 7.0$^{1/2}$ MPa, Fh: 17%, boiling point: 180° C.), diethylene glycol diethyl ether ($\delta H$: 9.5 MPa$^{1/2}$, Fh: 26%, boiling point: 298° C.), dibenzyl ether ($\delta H$: 7.4 MPa$^{1/2}$, Fh: 26%, boiling point: 298° C.), tetramethylurea ($\delta H$: 8.1 MPa$^{1/2}$, Fh: 22%, boiling point: 177° C.), 2-pyrrolidone ($\delta H$: 5.2 MPa$^{1/2}$, Fh: 20%, boiling point: 245° C.), 1-n-octyl-2-pyrrolidone ($\delta H$: 8.4 MPa$^{1/2}$, Fh: 21%, boiling point: 170° C.), 1,3-dimethyl-2-imidazolidinone ($\delta H$: 6.7 MPa$^{1/2}$, Fh: 21%, boiling point: 224° C.), propylene 1,2 carbonate (Fh: 10%, boiling point: 242° C.), dimethyl sulphoxide (Fh: 23%, boiling point: 189° C.), and diethylene glycol monoether (Fh: 32%, boiling point: 230° C.). The above-listed examples may be used alone or in combination.

Since the ink includes the compound where the compound has a boiling point of 170° C. or higher and an absolute value of a difference between a ratio Fh of the compound represented by Mathematical Formula 1 and a ratio Fh of the resin in the substrate represented by Mathematical Formula 1 is 5% or less, affinity between the substrate and the organic solvents included in the ink is enhanced to assure high fixability. Since the organic solvents have relatively high boiling points, moreover, formation of a resin film near an edge of a nozzle of an ink-jet printer can be prevented and high discharging reliability can be assured.

An amount of the compound where the compound has a boiling point of 170° C. or higher and an absolute value of a difference between a ratio Fh of the compound represented by Mathematical Formula 1 and a ratio Fh of the resin in the substrate represented by Mathematical Formula 1 is 5% or less is preferably 10% by mass or greater, more preferably 20% by mass or greater, and even more preferably 30% by mass or greater, relative to a total amount of the organic solvents in the ink. When the amount of the compound is 10% by mass or greater, affinity of a substrate to the ink is enhanced and thus excellent fixability can be obtained when the ink is used for an ink-jet printing method.

The resin in the substrate including a resin means a resin of an outermost surface layer of the substrate. When the substrate is formed of a resin film, for example, an Fh value of the resin means an Fh vale of a resin constituting the resin film. When the substrate is an impermeable substrate to which a resin layer of another type of a resin is disposed, moreover, an Fh value is an Fh value of a resin of the outermost resin layer. The detail of the substrate will be described later.

The compound where the compound has a boiling point of 170° C. or higher and an absolute value of a difference between a ratio Fh of the compound represented by Mathematical Formula 1 and a ratio Fh of the resin in the substrate represented by Mathematical Formula 1 is 5% or less can be confirmed by gas chromatography-mass spectrometry (GCMS). Specifically, an entire ink is subjected to GCMS to perform a quantitative analysis of the solvents included in the ink. Once types of the organic solvents are identified, a calibration curve of a concentration of each organic solvent is prepared to determine the quantity of each organic solvent included in the ink.

—Diol Compound Including 3 or 4 Carbon Atoms—

Addition of a diol compound including 3 or 4 carbon atoms among the organic solvents improves scratch resistance, fixability, and non-transferability.

Examples of the diol compound including 3 or 4 carbon atoms include 1,2-propanediol, 1,3-propanediol, 1,2-butanediol, and 2,3-butanediol. The above-listed examples may be used alone or in combination.

An amount of the diol compound including 3 or 4 carbon atoms is preferably 5% by mass or greater but 40% by mass or less and more preferably 10% by mass or greater but 27% by mass or less relative to a total amount of the organic solvents.

—2-Ethylhexyl Alcohol—

The organic solvents include 2-ethylhexyl alcohol.

When 2-ethylhexyl alcohol is included as the organic solvent, the resin or pigment dispersed in an ink can be present without being aggregated because compatibility of the resin or pigment improves, and therefore discharging reliability of the ink improves.

An amount of the 2-ethylhexyl alcohol is preferably 1% by mass or greater, more preferably 1% by mass or greater but 10% by mass or less, and even more preferably 3% by mass or greater but 5% by mass or less, relative to a total amount of the organic solvents.

The ink of the present disclosure may include other organic solvents according to the necessity, in addition to the compounds mentioned above.

Examples of the above-mentioned other organic solvents include: polyvalent alcohols, such as ethylene glycol, diethylene glycol, 3-methyl-1,3-butanediol, 2-methyl-2,4-pentanediol, triethylene glycol, polyethylene glycol, polypropylene glycol, 1,5-pentanediol, 1,6-hexanediol, glycerin, 1,2,6-hexanetriol, 2-ethyl-1,3-hexanediol, 1,2,4-butanetriol, 1,2,3-butanetriol, and 3-methylpentane-1,3,5-triol; polyvalent alcohol alkyl ethers, such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, dipropylene glycol monomethyl ether, and propylene glycol monoethyl ether; polyvalent alcohol aryl ethers, such as ethylene glycol monophenyl ether, and ethylene glycol monobenzyl ether; nitrogen-containing heterocyclic compounds, such as N-methyl-2-pyrrolidone, N-hydroxyethyl-2-pyrrolidone, ε-caprolactam, and γ-butyrolactone; amides, such as formamide, N-methylformamide, and N,N-dimethylformamide; amines, such as monoethanol amine, diethanol amine, and triethyl amine; sulfur-containing compounds, such as sulfolane and thiodiethanol; and ethylene carbonates. The above-listed examples may be used alone or in combination.

Boiling points of all of the organic solvents included in the ink are preferably 170° C. or higher but lower than 250° C.

When the boiling points of the organic solvents are 170° C. or higher but lower than 250° C., high discharging reliability is obtained and drying properties of a formed image are also excellent.

A total amount of the organic solvents is not particularly limited and may be appropriately selected depending on the intended purpose. However, the total amount of the organic solvents is preferably 20% by mass or greater but 70% by mass or less and more preferably 30% by mass or greater but 60% by mass or less relative to a total amount of the ink. The amount that is 20% by mass or greater but 70% by mass or less provides an excellent drying properties and a favorable discharging stability.

<Resin Particles>

The resin particles are not particularly limited and may be appropriately selected depending on the intended purpose. Examples of the resin particles include polyester resin particles, polyurethane resin particles, epoxy resin particles, polyamide resin particles, polyether resin particles, acrylic resin particles, acrylic-silicone resin particles, condensation-type synthetic resin particles of fluorine-based resins etc., polyolefin resin particles, polystyrene-based resin particles, polyvinyl alcohol resin particles, polyvinyl ester resin particles, polyacrylic acid resin particles, addition-type synthetic resin particles unsaturated carboxylic acid-based resins etc., and natural polymers such as celluloses, rosins, and natural rubbers. The above-listed examples may be used alone or in combination.

In terms of fixability over impermeable substrates, preferable among these resin particles are acrylic resin particles, acrylic-silicone resin particles, and polyurethane resin particles, and more preferable is polyurethane resin particles. In terms of scratch resistance of an image, preferable are polyester resin particles, polyvinyl chloride resin particles, and polyurethane resin particles. In terms of close adhesiveness with impermeable substrates, preferable are polyurethane resin particles and polyester resin particles.

The resin particles are not particularly limited and may be an appropriately synthesized product or a commercially available product.

—Polyurethane Resin Particles—

The polyurethane resin particles are not particularly limited and may be appropriately selected depending on the intended purpose. Examples of the polyurethane resin particles include polyurethane resin particles obtained by reacting a polyol with a polyisocyanate.

Examples of the polyol include polyether polyols, polycarbonate polyols, and polyester polyols. The above-listed examples may be used alone or in combination.

—Polyether Polyols—

Examples of the polyether polyols include polyether polyol obtained by polymerizing a starting material, which is at least one kind of a compound containing 2 or more active hydrogen atoms, through addition of an alkylene oxide.

Examples of the starting material include ethylene glycol, diethylene glycol, triethylene glycol, propylene glycol, trimethylene glycol, 1,3-butanediol, 1,4-butanediol, 1,6-hexanediol, glycerin, trimethylolethane, and trimethylolpropane. The above-listed examples may be used alone or in combination.

Examples of the alkylene oxide include ethylene oxide, propylene oxide, butylene oxide, styrene oxide, epichlorohydrin, and tetrahydrofuran. The above-listed examples may be used alone or in combination.

Examples of the polyether polyols for obtaining a binder for an ink capable of imparting an extraordinarily excellent scratch resistance include polyoxytetramethylene glycols and polyoxypropylene glycols. The above-listed examples may be used alone or in combination.

—Polycarbonate Polyols—

Examples of the polycarbonate polyols that can be used for producing the polyurethane resin particles include polycarbonate polyols obtained through a reaction between ester carbonate and polyol, and polycarbonate polyols obtained through a reaction between phosgene and bisphenol A. The above-listed examples may be used alone or in combination.

Examples of the ester carbonate include methyl carbonate, dimethyl carbonate, ethyl carbonate, diethyl carbonate, cyclocarbonate, and diphenyl carbonate. The above-listed examples may be used alone or in combination.

Examples of the polyol include: dihydroxy compounds having relatively low molecular weights such as ethylene glycol, diethylene glycol, triethylene glycol, 1,2-propylene glycol, 1,3-propylene glycol, dipropylene glycol, 1,4-butanediol, 1,3-butanediol, 1,2-butanediol, 2,3-butanediol, 1,5-pentanediol, 1,5-hexanediol, 2,5-hexanediol, 1,6-hexanediol, 1,7-hepetanediol, 1,8-octanediol, 1,9-nonanediol, 1,10-decanediol, 1,11-undecanediol, 1,12-dodecanediol, 1,4-cyclohexanediol, 1,4-cyclohexanedimethanol, hydroquinone, resorcin, bisphenol-A, bisphenol-F, and 4,4'-bisphenol; polyether polyols such as polyethylene glycols, polypropylene glycols, and polyoxytetramethylene glycols; and polyester polyols such as polyhexamethylene adipates, polyhexamethylene succinates, and polycaprolactones. The above-listed examples may be used alone or in combination.

—Polyester Polyols—

Examples of the polyester polyols include polyester polyols obtained by making a low-molecular-weight polyol and a polycarboxylic acid undergo an esterification reaction, polyesters obtained by making a cyclic ester compound such as ε-caprolactone undergo a ring-opening polymerization reaction, and copolymerized polyesters of the above-listed polyesters. The above-listed examples may be used alone or in combination.

Examples of the low-molecular-weight polyol include ethylene glycol and propylene glycol. The above-listed examples may be used alone or in combination.

Examples of the polycarboxylic acid include succinic acid, adipic acid, sebacic acid, dodecanedicarboxylic acid, terephthalic acid, isophthalic acid, phthalic acid, and anhydrides or ester-forming derivatives of the above-listed acids. The above-listed examples may be used alone or in combination.

—Polyisocyanate—

Examples of the polyisocyanate include: aromatic diisocyanates such as phenylene diisocyanate, tolylene diisocyanate, diphenylmethane diisocyanate, and naphthalene diisocyanate; and aliphatic or alicyclic diisocyanates such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, and 2,2,4-trimethylhexamethylene diisocyanate. The above-listed examples may be used alone or in combination. Preferable among these polyisocyanates are aliphatic or alicyclic diisocyanates in terms of weather resistance over a long period of time, because the ink of the present disclosure will be used also for outdoor use such as a poster or a signage, so that the ink needs to form a coating film having a very high weather resistance over a long period of time.

Furthermore, additional use of at least one alicyclic diisocyanate makes it easier to obtain an intended coating film strength and an intended scratch resistance.

Examples of the alicyclic diisocyanate include isophorone diisocyanate and dicyclohexylmethanediisocyanate.

An amount of the alicyclic diisocyanate is preferably 60% by mass or greater relative to a total amount of isocyanate compounds.

<Method for Producing Polyurethane Resin Particles>

The polyurethane resin particles used in the ink of the present disclosure can be obtained according to producing methods hitherto commonly used. One example of the producing methods hitherto commonly used include the following method.

First, in the absence of a solvent or in the presence of an organic solvent, the polyol is allowed to react with the polyisocyanate in an equivalent ratio so that isocyanate groups are excessively present, to produce an isocyanate-terminated urethane prepolymer.

Next, anionic groups in the isocyanate-terminated urethane prepolymer are optionally neutralized with a neutralizing agent and allowed to react with a chain extender, and, finally, the organic solvent in a system is optically removed. As a result, the polyurethane resin particles are obtained.

Examples of the organic solvent that can be used for producing the polyurethane resin particles include: ketones such as acetone and methyl ethyl ketone; ethers such as tetrahydrofuran and dioxane; acetic acid esters such as ethyl acetate and butyl acetate; nitriles such as acetonitrile; and amides such as dimethyl formamide, N-methylpyrrolidone, and N-ethylpyrrolidone. The above-listed examples may be used alone or in combination.

Examples of the chain extender include polyamines and other active hydrogen group-containing compounds.

Examples of the polyamines include: diamines such as ethylene diamine, 1,2-propanediamine, 1,6-hexamethylenediamine, piperazine, 2,5-dimethylpiperazine, isophoronediamine, 4,4'-dicyclohexylmethane diamine, and 1,4-cyclohexane diamine; polyamines such as diethylene triamine, dipropylene triamine, and triethylene tetramine; hydrazines such as hydrazine, N,N'-dimethylhydrazine, and 1,6-hexamethylene bishydrazine; and dihydrazides such as succinic dihydrazide, adipic dihydrazide, glutaric dihydrazide, sebacic dihydrazide, and isophthalic dihydrazide. The above-listed examples may be used alone or in combination.

Examples of the other active hydrogen group-containing compounds include glycols such as ethylene glycol, diethylene glycol, triethylene glycol, propylene glycol, 1,3-propanediol, 1,3-butanediol, 1,4-butanediol, hexamethylene glycol, saccharose, methylene glycol, glycerin, and sorbitol; phenols such as bisphenol A, 4,4'-dihydroxydiphenyl, 4,4'-dihydroxydiphenyl ether, 4,4'-dihydroxydiphenyl sulfone, hydrogenated bisphenol A, and hydroquinone; and water. The above-listed examples may be used alone or in combination so long as storage stability of an ink is not deteriorated.

Preferable as the polyurethane resin particles is polycarbonate urethane resin particles in terms of water resistance, heat resistance, wear resistance, weather resistance, and image scratch resistance that are based on a high cohesive force of a carbonate group. Use of the polycarbonate urethane resin particles makes it possible to obtain an ink suitable for a print to be used in a severe environment such as outdoor.

As the polyurethane resin particles, commercially available products may be used. Examples of the commercially available products include YUKOTO UX-485 (polycarbonate urethane resin particles), YUKOTO UWS-145 (polyester urethane resin particles), PAMARIN UA-368T (polycarbonate urethane resin particles), and PAMARIN UA-200

(polyether urethane resin particles (all available from Sanyo Chemical Industries, Ltd.). The above-listed examples may be used alone or in combination.

—Vinyl Chloride Resin Particles—

Preferable as the vinyl chloride resin particles are a vinyl chloride-ethylene copolymer and a vinyl chloride-acrylic copolymer in terms of securing miscibility with a pigment and any other resin particles contained in the ink. More preferable is a vinyl chloride-ethylene copolymer because of a particularly excellent close adhesiveness with a non-polar substrate.

The vinyl chloride resin particles are not particularly limited and may be a commercially available product. Examples of the vinyl chloride resin particles include a commercially available polyvinyl chloride resin emulsion, a commercially available vinyl chloride-acrylic copolymer emulsion, and a commercially available vinyl chloride-ethylene copolymer emulsion. The above-listed examples may be used alone or in combination.

Examples of the commercially available polyvinyl chloride resin emulsion include product No. 985 (solid content: 40% by mass, anionic) among VINYBLAN (registered trademark) series available from Nissin Chemical Co., Ltd. The above-listed examples may be used alone or in combination.

Examples of the commercially available vinyl chloride-acrylic copolymer emulsion include product Nos. 278 (solid content: 43% by mass, anionic), 700 (solid content: 30% by mass, anionic), 701 (solid content: 30% by mass, anionic), 711 (solid content: 50% by mass, anionic), 721 (solid content: 30% by mass, anionic), 700FS (solid content: 30% by mass, anionic), 701RL35 (solid content: 30% by mass, anionic), 701RL (solid content: 30% by mass, anionic), and 701RL65 (solid content: 30% by mass, anionic) among VINYBLAN (registered trademark) series available from Nissin Chemical Co., Ltd. The above-listed examples may be used alone or in combination.

Examples of the commercially available vinyl chloride-ethylene copolymer emulsion include product Nos. 1010 (solid content: 50±1% by mass, anionic), 1210 (solid content: 50±1% by mass, anionic), and 1320 (solid content: 50±1% by mass, anionic) among SUMIELITE (registered trademark) series available from Sumika Chemtex Co., Ltd. The above-listed examples may be used alone or in combination.

Examples of other commercially available products include product Nos. E15/48A (solid content: 50% by mass, anionic) and E22/48A (solid content: 30% by mass, anionic) among VINNOL series that are available from Wacker Chemie AG and obtained by incorporating a hydroxyl component into a vinyl chloride resin. The above-listed examples may be used alone or in combination.

—Polyester Resin Particles—

Preferable as the polyester resin particles are polyester resin particles free of a hydrophilic component such as an emulsifier and a sulfonic acid salt that may remain in a coating film after dried in order to obtain water resistance of an image.

The polyester resin particles are not particularly limited and may be a commercially available product. Examples of commercially available polyester resin emulsions include: product Nos. KZA-1449 (solid content: 30% by mass, anionic), KZA-3556 (solid content: 30% by mass, anionic), and KZA-0134 (solid content: 30% by mass, anionic) among EMULSION ELIETEL (registered trademark) series available from Unitika Ltd.; and product Nos. A-124GP (solid content: 30% by mass), A-125S (solid content: 30% by mass), and A-160P (solid content: 25% by mass) among PESRESIN A series available from Takamatsu Oil & Fat Co., Ltd. The above-listed examples may be used alone or in combination.

The resin particles are not particularly limited and are preferably resin particles supplied in a state of a water-based emulsion. Considering ease of an operation for blending the resin particles with a solvent, a colorant, and water to prepare a water-based ink, uniform dispersion of the resin particles in the ink to the maximum degree possible, etc., it is preferable to add the resin particles in the ink in a resin emulsion state, which is a state in which the resin particles are stably dispersed in water, which is a dispersion medium.

In actual use, the resin particles are facilitated to form a film by a water-soluble organic solvent added during ink production and are promoted to form a film upon vaporization of the solvent and water. Therefore, a heating step is not indispensable in use of the ink of the present disclosure.

Upon dispersing the resin particles into an aqueous medium, forced emulsification utilizing a dispersing agent may be used. In the case of forced emulsification, however, the dispersing agent may remain on a coating film to decrease strength of the coating film. In order to prevent this result, so-called self-emulsifying resin particles which have anionic groups in a molecular structure are preferable.

An acid value of the anionic groups of the self-emulsifying resin particles is preferably 5 mgKOH/g or higher but 100 mgKOH/g or lower and more preferably 5 mgKOH/mg or higher but 50 mgKOH/mg or lower from the viewpoint of dispersibility in water, scratch resistance, and chemical resistance.

Examples of the anionic groups include a carboxyl group, a carboxylate group, a sulfonic group, and a sulfonate group. Among these anionic groups, a carboxylate group and a sulfonate group that are partially or totally neutralized with, for example, a basic compound are preferable from the viewpoint of maintaining good water-dispersion stability. It is possible to use a monomer containing the anionic groups in order to incorporate the anionic groups into the resin.

Examples of a method for producing a water dispersion of the resin particles containing the anionic groups include a method for adding a basic compound which can be used for neutralizing the anionic groups in the water dispersion.

Examples of the basic compound include: organic amines such as ammonia, trimethyl amine, pyridine, and morpholine; alkanol amines such as monoethanolamine; and metallic basic compounds containing, for example, Na, K, Li, or Ca. The above-listed examples may be used alone or in combination.

The method for producing a water dispersion of the forced-emulsifying resin particles may use a surfactant. Examples of the surfactant include nonionic surfactants and anionic surfactants. The above-listed examples may be used alone or in combination. Among these surfactants, nonionic surfactants are preferable from the viewpoint of water resistance.

Examples of the nonionic surfactants include polyoxyethylene alkyl ether, polyoxyethylene alkylene alkyl ether, polyoxyethylene derivatives, polyoxyethylene fatty acid esters, polyoxyethylene polyvalent alcohol fatty acid esters, polyoxyethylene propylene polyols, sorbitan fatty acid esters, polyoxyethylene hydrogenated castor oils, polyoxyalkylene polycyclic phenyl ethers, polyoxyethylene alkylamines, alkylalkanolamides, and polyalkylene glycol (meth)acrylates. Among the above-listed examples, preferable are polyoxyethylene alkyl ethers, polyoxyethylene fatty acid esters, polyoxyethylene sorbitan fatty acid esters, and polyoxyethylene alkylamines. The above-listed examples may be used alone or in combination.

Examples of the anionic surfactants include alkyl sulfuric acid ester salts, polyoxyethylene alkylether sulfates, alkyl benzene sulfonates, α-olefin sulfonates, methyl taurate, sulfosuccinate, ether sulfonates, ether carbonates, fatty acid salts, naphthalene sulfonic acid formalin condensates, alkyl amine salts, quaternary ammonium salts, alkyl betaines, and alkyl amine oxides. Among the above-listed examples, preferable are polyoxyethylene alkyl ether sulfates and sulfosuccinate.

An amount of the surfactant is not particularly limited and may be appropriately selected depending on the intended purpose. However, the amount is preferably 0.1% by mass or greater but 30% by mass or less and more preferably 5% by mass or greater but 20% by mass or less relative to a total amount of the resin particles. When the amount is 0.1% by mass or greater but 30% by mass or less, the resin particles form a film favorably, an ink excellent in adhesion and water resistance is obtained, and print is used favorably without blocking.

A volume average particle diameter of the resin particles is not particularly limited and may be appropriately selected depending on the intended purpose. However, considering use in an ink-jet printing apparatus, the volume average particle diameter is preferably 10 nm or greater but 1,000 nm or less, more preferably 10 nm or greater but 200 nm or less, and particularly preferably 10 nm or greater but 100 nm or less.

Resin particles having a volume average particle diameter of 10 nm or greater but 1,000 nm or less have more sites to contact a water-soluble organic solvent on the surface and have a higher film forming performance to form a tough continuous coating film of the resin. This makes it possible to obtain a high image hardness.

The volume average particle diameter can be measured with, for example, a particle size analyzer (MICROTRAC MODEL UPA 9340 available from Nikkiso Co., Ltd.).

An amount of the resin particles is preferably 1% by mass or greater but 15% by mass or less relative to the total amount of the ink in terms of fixability over impermeable substrates, and more preferably 5% by mass or greater but 12% by mass or less relative to a total amount of the ink because improved smoothness of an ink coating film, a high gloss level, and an improved fixability over impermeable substrates are obtained.

Qualitative and quantitative properties of the resin particles can be confirmed according to a procedure as detailed in Yasuda, Takeo. "Test methods and evaluation results of dynamic characteristics of plastic materials (22)", *Plastics*: Journal of the Japan Plastics Industry Federation, "Plastics" editors' board. Specifically, qualitative and quantitative properties can be confirmed by an analysis according to infrared spectroscopy (IR), a thermal analysis (DSC, TG/DTA), pyrolysis gas chromatography (PyGC), nuclear magnetic resonance (NMR), etc.

The ink of the present disclosure can improve adhesion thereof when the ink is heated after printing because heating reduces any residual solvent. Particularly, when a minimum filming temperature (hereinafter may also be referred to as "MFT") of the resin particles is higher than 80° C., it is preferable to perform heating in terms of eliminating a film forming failure of the resin and improving image robustness.

Adjustment of the minimum filming temperature of the resin emulsion for obtaining the ink of the present disclosure can be achieved by controlling a glass transition temperature (hereinafter may also be referred to as "Tg") of the resin. When the resin particles are made of a copolymer, adjustment can be achieved by changing ratios of the monomers forming the copolymer. In the present disclosure, the minimum filming temperature refers to a lowest possible temperature at which a resin emulsion that is thinly cast over a metal plate such as aluminium forms a transparent continuous film as a result of temperature elevation, and refers to a point, in a temperature region lower than which the emulsion is in a white powder state. Specifically, the minimum filming temperature refers to a value measured with a commercially available minimum filming temperature measuring instrument such as "a filming temperature tester" (available from Imoto Machinery Co., Ltd.), "TP-801 MFT TESTER" (available from Tester Sangyo Co., Ltd.).

The minimum filming temperature changes also by control of the particle diameter of the resin. Therefore, it is possible to obtain an intended minimum filming temperature value based on these controllable factors.

<Color Material>

The color material is not particularly limited and may be appropriately selected depending on the intended purpose. Examples of the color material include pigments and dyes. Among these color materials, pigments are preferable.

Examples of the pigments include inorganic pigments and organic pigments.

Examples of the inorganic pigments include titanium oxide and iron oxide, calcium carbonate, barium sulfate, aluminium hydroxide, barium yellow, cadmium red, and chrome yellow, and in addition, carbon blacks produced by known methods such as a contact method, a furnace method, and a thermal method. The above-listed examples may be used alone or in combination.

Examples of the organic pigments include: azo-pigments (e.g., azo lake, insoluble azo-pigments, condensed azo-pigments, and chelate azo-pigments); polycyclic pigments (e.g., phthalocyanine pigments, perylene pigments, perionone pigments, anthraquinone pigments, quinacridone pigments, dioxazine pigments, indigo pigments, thioindigo pigments, isoindolinone pigments, and quinophthalone pigments); dye chelates (e.g., basic dye chelates and acid dye chelates); nitro pigments; nitroso pigments; and aniline black. The above-listed examples may be used alone or in combination.

Other usable examples of the pigments include resin hollow particles and inorganic hollow particles.

Among the pigments above, pigments having good affinity with a solvent are preferably used.

An amount of the pigment is preferably 0.1% by mass or greater but 10% by mass or less and preferably 1% by mass or greater but 10% by mass or less relative to a total amount of the ink. When the amount is 0.1% by mass or greater but 10% by mass or less, image density, fixability, and discharging stability can be improved.

Specific examples of the pigments for black include: carbon blacks (C.I. Pigment Black 7) such as furnace black, lamp black, acetylene black, and channel black; metals such as copper, iron (C.I. Pigment Black 11); and organic pigments, such as aniline black (C.I. Pigment Black 1). The above-listed examples may be used alone or in combination.

Moreover, examples of the pigments for colors include: C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, and 155; C.I. Pigment Orange 5, 13, 16, 17, 36, 43, and 51; C.I. Pigment Red 1, 2, 3, 5, 17, 22, 23, 31, 38, 48:2, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (colcothar), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C.I. Pigment Violet 1 (rhodamine lake), 3, 5:1, 16, 19, 23, and 38; C.I. Pigment Blue 1, 2, 15 (phthalocyanine blue), 15:1, 15:2, 15:3 (phthalocyanine blue), 16, 17:1, 56, 60, and 63; and C.I. Pigment Green 1, 4, 7, 8, 10, 17, 18, and 36. The above-listed examples may be used alone or in combination.

It is possible to use a self-dispersible pigment that is made dispersible in water by addition of a functional group such as a sulfone group and a carboxyl group on a surface of the pigment (for example, carbon black).

It is also possible to use a pigment encapsulated in a microcapsule to be made dispersible in water, i.e., resin particles containing pigment particles.

In this case, there is no need that all of the pigment particles to be contained in the ink be encapsulated in or adsorbed to the resin particles, but the pigment may be dispersed in the ink in a range in which the effect of the present disclosure is not spoiled.

A number average particle diameter of the pigment is not particularly limited and may be appropriately selected depending on the intended purpose. However, a most frequent particle diameter based on a largest number of particles is preferably 20 nm or greater but 150 nm or less. A number average particle diameter of 20 nm or greater facilitates a dispersing operation and a classifying operation. A number average particle diameter of 150 nm or less is preferable because not only an improved pigment dispersion stability of the ink, but also an excellent discharging stability and improved image qualities such as image density will be obtained.

The number average particle diameter can be measured with, for example, a particle size analyzer (MICROTRAC MODEL UPA 9340 available from Nikkiso Co., Ltd.).

When a dispersing agent is used to disperse the pigment, the dispersing agent is not particularly limited and may be any known dispersing agent. Examples of the dispersing agent include polymeric dispersing agents and water-soluble surfactants. The above-listed examples may be used alone or in combination.

<Water>

The water is not particularly limited and may be appropriately selected depending on the intended purpose. Examples of the water include pure water and ultrapure water such as ion-exchanged water, ultrafiltrated water, reverse osmotic water, and distilled water. The above-listed examples may be used alone or in combination.

An amount of the water is preferably 15% by mass or greater but 60% by mass or less and more preferably 20% by mass or greater but 40% by mass or less relative to the total amount of the ink. The amount that is 15% by mass or greater prevents viscosity thickening and improves discharging stability. The amount that is 60% by mass or less provides a favorable wettability into impermeable substrates and improves image qualities.

<Other Components>

Examples of the other components include a surfactant, an antiseptic-antifungal agent, an anti-rust agent, a pH regulator, and a colorless anti-aging agent such as hindered phenols and hindered phenolamines intended for rubbers and plastics.

—Surfactant—

The surfactant may be contained in order to ensure wettability into substrates.

The surfactant is not particularly limited and may be appropriately selected depending on the intended purpose.

Examples of the surfactant includes amphoteric surfactants, nonionic surfactants, and anionic surfactants. The above-listed examples may be used alone or in combination. Among these surfactants, nonionic surfactants are preferable in terms of dispersion stability and image qualities.

Fluorine-based surfactants and silicone-based surfactants may also be used in combination or alone depending on the composition.

Examples of the nonionic surfactants include polyoxyethylene alkylphenyl ethers, polyoxyethylene alkyl esters, polyoxyethylene alkylamines, polyoxyethylene alkylamides, polyoxyethylene propylene block polymers, sorbitan fatty acid esters, polyoxyethylene sorbitan fatty acid esters, and ethylene oxide adducts of acetylene alcohol. The above-listed examples may be used alone or in combination.

An amount of the surfactant is preferably 0.1% by mass or greater but 5% by mass or less. The amount that is 0.1% by mass or greater can ensure wettability into impermeable substrates and improve image qualities. The amount that is 5% by mass or less makes the ink hardly foamable and ensures an excellent discharging stability.

—Defoaming Agent—

The defoaming agent has no particular limit. For example, silicone-based defoaming agents, polyether-based defoaming agents, and fatty acid ester-based defoaming agents are suitable. These can be used alone or in combination. Of these, silicone-based defoaming agents are preferable to easily break foams.

—Preservatives and Fungicides—

The preservatives and fungicides are not particularly limited. A specific example is 1,2-benzisothiazolin-3-one.

—Corrosion Inhibitor—

The corrosion inhibitor has no particular limit. Examples thereof are acid sulfite and sodium thiosulfate.

—pH Regulator—

The pH regulator has no particular limit as long as it can adjust pH to 7 or higher. Examples thereof include, but not limited to, amines such as diethanol amine and triethanol amine.

<Method for Producing Ink>

As a method for producing the ink, the ink can be produced by stirring and mixing the water, the organic solvent, the resin particles, and the color material, and as needed, the other components. The stirring and mixing may use, for example, a sand mill, a homogenizer, a ball mill, a paint shaker, an ultrasonic disperser, a stirrer using a typical stirring blade, a magnetic stirrer, and a high-speed disperser.

A viscosity of the ink at 25° C. is preferably 2 mPa·s or greater and more preferably 3 mPa·s or greater but 20 mPa·s or less in terms of image quality such as quality of printed letters when printed on substrates. When the viscosity is 2 mPa·s or greater, discharging reliability can be improved.

(Set of Ink and Substrate)

A set of an ink and a substrate of the present disclosure is a set of an ink that includes water, an organic solvent, a color material, and resin particles, and a substrate including a resin The ink includes, as organic solvents, a compound, a diol compound including 3 or 4 carbon atoms, and 2-ethylhexyl alcohol, where the compound has a boiling point of 170° C. or higher and an absolute value of a difference between a ratio Fh of the compound represented by Mathematical Formula 1 below and a ratio Fh of the resin in the substrate represented by Mathematical Formula 1 below is 5% or less.

$$Fh(\%)=[\delta H/(\delta D+\delta P+\delta H)]\times 100 \quad \text{<Mathematical Formula 1>}$$

In Mathematical Formula 1, δH is a hydrogen bond term of the Hansen solubility parameter, δD is a dispersion term of the Hansen solubility parameter, and δP is a polarity term of the Hansen solubility parameter.

As the ink, the ink of the present disclosure is used.
<Substrate>

The substrate includes a resin and preferably includes a resin on a surface of the substrate. Examples of the substrate include permeable substrates and impermeable substrates. Among the above-listed examples, impermeable substrates are preferable.

Examples of the permeable substrate include plane paper, synthetic paper, and cloth. In the case where any of these permeable substrates are used, for example, a substrate where a layer including a resin is laminated on the plane paper can be used.

The impermeable substrate is a substrate having a surface with a surface whose water transmittance, or absorption, or adsorption is low, includes a material that may have a number of cavities inside where the cavities are not open to the outside, and more quantitatively, means a substrate having a water absorption amount of 10 mL/m$^2$ or less from the initial contact to 30 msec$^{1/2}$ according to the Bristow method.

Examples of the impermeable substrate include polyvinyl chloride (PVC) films, polyethylene terephthalate (PET) films, polycarbonate films, polyethylene films, polystyrene films, polymethyl methacrylate films, chlorinated polypropylene films, unsaturated polyester films, polyethyl methacrylate films, polyvinyl acetate films, polyisobutylene films, and polyvinyl butyral films. The above-listed examples may be used alone or in combination.

As the impermeable substrate, a commercial product may be used, or a film formed, for example, by forming a film from a resin through melt extrusion molding.

Moreover, the impermeable substrate may be an impermeable substrate having a resin layer on a surface thereof.

The substrate is not limited to substrates used for typical recording media, such as the permeable substrate and the impermeable substrate. As the substrate, building materials, such as wall paper and flooring materials, cloth such as clothes, textiles, leather, etc. can be appropriately used. Moreover, ceramic, glass, metal, etc. can be also used as the substrate by adjusting a structure of a path for transferring the substrate. In this case, such a material can be used as a substrate onto which a layer including a resin is laminated according to the necessity.

In the present disclosure, an absolute value of a difference between a ratio Fh of the organic solvent in the ink represented by Mathematical Formula 1 and a ratio Fh of the resin in the substrate used for printing represented by Mathematical Formula 1 is preferably 5% or less and more preferably 3% or less. Since Fh of the organic solvent in the ink and Fh of the resin in the substrate have values close to each other as mentioned above, fixability over impermeable substrates improves.

In the present specification, the resin in the substrate means a resin of an outermost surface layer of the substrate. In case of an impermeable substrate in which another type of a resin layer is disposed on a resin film, for example, Fh of the resin in the substrate is an Fh value of the resin layer that present the outermost side.

An average thickness of the substrate is not particularly limited and may be appropriately selected depending on the intended purpose. The average thickness is preferably 0.3 mm or greater but 0.8 mm or less.
<Ink Stored Container>

An ink stored container for use in the present disclosure includes a container, and the ink of the present disclosure or an ink in the set of an ink and a substrate of the present disclosure where the ink is stored in the container.

The ink cartridge includes a container and the ink stored in the container, and may further include appropriately selected other members according to the necessity.

The container is not particularly limited and a shape, structure, size, material, etc. of the container are appropriately selected depending on the intended purpose. Examples of the container include containers each including at least an ink bag formed of an aluminium laminate film, a resin film, etc.

(Ink-Jet Printing Method and Ink-Jet Printer)

An ink-jet printer of the present disclosure includes at least an ink discharging unit, preferably includes a heating unit, and may further include appropriately selected other units according to the necessity.

An ink-jet printing method of the present disclosure includes at least an ink discharging step, preferably includes a heating step, and may further include appropriately selected other steps according to the necessity.

The ink-jet printing method is suitably performed by the ink-jet printer of the present disclosure. The ink discharging step can be suitably performed by the ink discharging unit. The heating step can be suitably performed by the heating unit. The above-mentioned other steps can be suitably performed by the above-mentioned other units.
<Ink Discharging Step and Ink Discharging Unit>

The ink discharging step is a step including applying stimuli to the ink of the present disclosure or the ink from the set of an ink and a substrate of the present disclosure to discharge the ink onto a substrate. The ink discharging step can be performed by the ink discharging unit.

The ink discharging unit is not particularly limited and may be appropriately selected depending on the intended purpose. Examples of the ink discharging unit include ink-jet heads.

Examples of the ink-jet heads include a piezo inkjet head (see Japanese Examined Patent Publication No. 02-51734) using a piezoelectric element as a pressure generating unit to pressurize an ink in an ink flow path to deform a vibration plate constituting a wall surface of the ink flow path and change the internal cubic capacity of the ink flow path to discharge ink droplets, a thermal inkjet head (see Japanese Examined Patent Publication No. 61-59911) using a heating resistor to heat an ink in an ink flow path and generate bubbles, and an electrostatic inkjet head (see Japanese Unexamined Patent Application Publication No. 06-71882) using a vibration plate constituting a wall surface of an ink flow path and an electrode disposed counter to the vibration plate to deform the vibration plate by the effect of an electrostatic force generated between the vibration plate and the electrode and change the internal cubic capacity of the ink flow path to discharge ink droplets.

For example, the stimuli can be generated by the stimuli generating unit. The stimuli is not particularly limited and may be appropriately selected depending on the intended purpose. Examples of the stimuli include heat (temperature), pressure, vibrations, and light. The above-listed examples may be used alone or in combination. Among the above-listed examples, heat and pressure are preferable.

An embodiment for flying the ink is not particularly limited and is different depending on the kind of the stimuli, etc. For example, when the stimuli is "heat", there is a method using, for example, a thermal head for applying a thermal energy corresponding to a recording signal to the ink in a discharging head to generate bubbles in the ink by the thermal energy and discharge and jet the ink from nozzle holes of the discharging head in a form of liquid droplets by a pressure of the bubbles. When the stimuli is "pressure", there is a method for, for example, applying a voltage to a piezoelectric element bonded to a position called a pressure chamber present in an ink flow path in a recording head to flex the piezoelectric element and shrink the cubic capacity of the pressure chamber to discharge and jet the ink from nozzle holes of the discharging head in a form of liquid droplets.

A size of the liquid droplets of the ink to be flown is preferably 3 pL or greater but 40 pL or less. A discharging/jetting speed of the liquid droplets of the ink is preferably 5 m/s or higher but 20 m/s or lower. A driving frequency for flying the liquid droplets of the ink is preferably 1 kHz or higher. A resolution of the liquid droplets of the ink is preferably 300 dpi or higher.

<Heating Step and Heating Unit>

The heating step is a step including heating the substrate to which the ink has been applied. The heating step can be performed by the heating unit.

According to the ink-jet printing method, printing of images of high image quality can be performed on an impermeable substrate serving as the substrate. In order to form an image of the higher image quality, high abrasion resistance, and high adhesion, as well as making printing correspond to high-speed printing conditions, the impermeable substrate is preferably heated after printing. When the heating step is performed after printing, formation of a film of the resin included in the ink is accelerated and therefore hardness of an image of print can be improved.

The heating unit may be any of many known devices. Examples of the heating unit include devices for, for example, forced-air heating, radiation heating, conduction heating, high-frequency drying, and microwave drying. One of these heating units may be used alone or two or more of these heating units may be used in combination.

A temperature for the heating may be varied depending on the kind and amount of a water-soluble solvent contained in the ink and a minimum filming temperature of the resin emulsion added, and may also be varied depending on the kind of the base material to be printed.

The temperature for the heating is preferably high, more preferably 40° C. or higher but 120° C. or lower, and particularly preferably 50° C. or higher but 90° C. or lower in terms of drying properties and a filming temperature. When the temperature for the heating is 40° C. or higher but 120° C. or lower, it is possible to prevent the impermeable base material from being damaged by heat and to suppress blank discharging due to warming of an ink head.

<Other Steps and Other Units>

Examples of the above-mentioned other steps include a stimuli generating step and a controlling step.

Examples of the above-mentioned other units include a stimuli generating unit and a controlling unit.

Examples of the stimuli generating unit include heating devices, pressure devices, piezoelectric elements, vibration generating devices, ultrasonic oscillators, and lights. Specific examples of the stimuli generating unit include: a piezoelectric actuator such as a piezoelectric element; a thermal actuator that uses a thermoelectric transducer such as a heat element and utilizes phase change caused by film boiling of a liquid; a shape memory alloy actuator that utilizes a metal phase change caused by a temperature change; and an electrostatic actuator that utilizes electrostatic force.

The controlling unit is not particularly limited and may be appropriately selected depending on the intended purpose so long as the controlling unit is capable of controlling the operations of each unit. Examples of the controlling unit include devices such as a sequencer and a computer.

One example of the ink-jet printing method of the present disclosure may be a printing method including a step where a clear ink free from a pigment or an ink (white ink) including a white pigment as a pigment is applied onto a substrate and a printing step where printing is performed using an ink including a pigment of another color. The clear ink or the white ink may be applied over a full surface of a substrate or may be applied over part of the substrate. In case of application over part of the substrate, for example, the clear ink or the white ink may be applied over the same portion to which printing will be performed, or may be applied over a portion that partially overlaps with a portion to which printing will be performed.

In the case where the white ink is used, a printing method described below may be effective. The white ink is applied over a substrate, and printing is performed over the white ink with an ink having any other color than white. This method can ensure visibility of the print even over a transparent film, because the white ink is attached over the surface of the substrate. The ink for use in the present disclosure has favorable drying properties, a high gloss, scratch resistance, etc. even over impermeable substrates. This allows for applying the white ink over impermeable substrates such as transparent films to improve visibility.

Applying the white ink after performing printing over a transparent film also makes it possible to obtain an image likewise excellent in visibility. The clear ink applied instead of the white ink can function as a protective layer.

How to use the ink is not limited to the ink-jet printing method and the ink can be widely used. Specific examples of such methods other than the ink-jet printing method include, but are not limited to, blade coating methods, gravure coating methods, bar coating methods, roll coating methods, dip coating methods, curtain coating methods, slide coating method, die coating methods, and spray coating methods.

An example mode may be performed by using an applying method other than an ink-jet printing method when the white ink is applied over a full surface of a substrate and using an ink-jet printing method when printing is performed with an ink having any other color than white.

Another possible mode may be performed by using an ink-jet printing method for performing both of printing with a white ink and printing with an ink having any other color than white.

The same applies to cases when the clear ink is used instead of the white ink.

As an example of the ink-jet printer and ink-jet printing method of the present disclosure, a case of a printing device and printing method using a print medium as a substrate will be described. However, the present disclosure is not limited to this example.

<Printing Device and Printing Method>

The ink of the present disclosure can be suitably applied to various image printing devices, such as printers, facsimile machines, photocopiers, printer/fax/copier multifunction peripherals, and 3D model manufacturing devices.

In the present disclosure, the printing device and the printing method represent a device capable of discharging an ink various processing fluids, etc. to a print medium and a method printing an image on the print medium using the device. The print medium means an article to which the ink or the various processing fluids can be attached at least temporarily.

The printing device may further optionally include a device relating to feeding, transferring, and ejecting the print medium and other devices referred to as a pre-processing device, a post-processing device, etc., in addition to the head portion to discharge the ink.

The printing device and the printing method may further optionally include a heating unit for use in the heating process, and a drying unit for use in the drying process. For example, the heating unit and the drying unit include devices that head and dry a printed surface or back surface of a print medium. The heating unit and the drying unit are not particularly limited. For example, a fan heater and an infra-red heater can be used. Heating and drying can be performed before, during, and after printing.

In addition, the printing device and the printing method are not limited to those producing merely meaningful visible image, such as texts and figured with the ink. For example, the image printing device and the printing method can produce patterns like geometric design and 3D images.

In addition, the printing device includes both a serial type device in which a discharging head is caused to move and a line type device in which the discharging head is not moved.

Furthermore, in addition to the desktop type, this printing device includes a large-width printing device capable of printing an image on an AO-size print medium and a continuous printer capable of using continuous paper wound up in a roll as a print medium.

Figure 2:
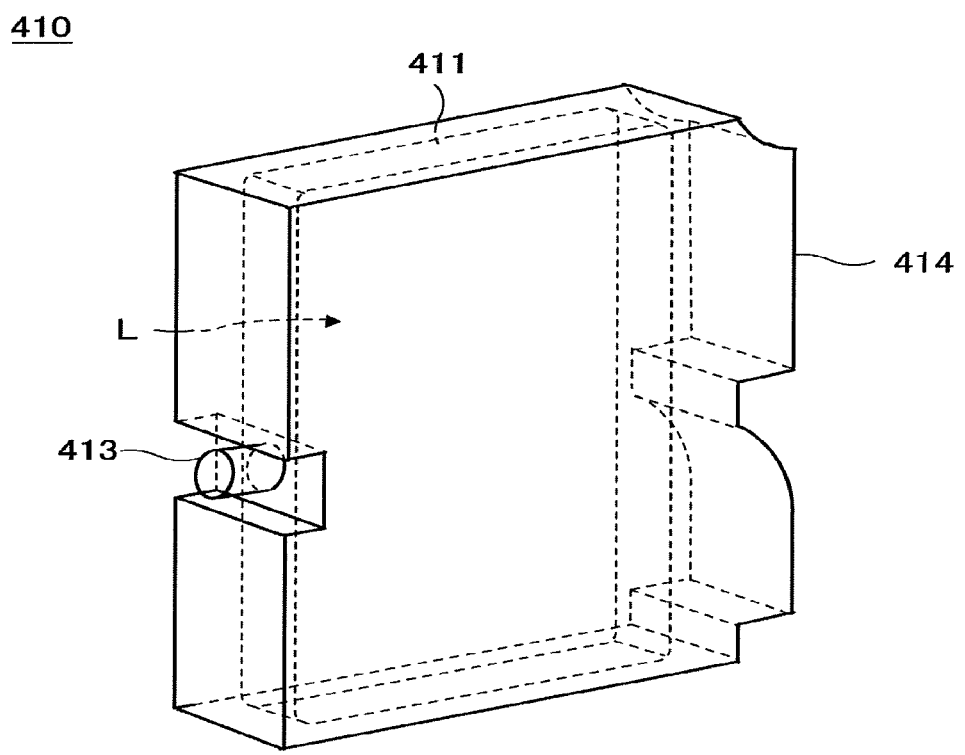
FIG. 2 is a perspective view illustrating one example of a main tank of the ink-jet printing device.

One example of the printing device will be explained with reference to FIG. 1 and FIG. 2. FIG. 1 is a perspective view illustrating the printing device. FIG. 2 is a perspective view illustrating the main tank. A printing device 400 as an example of the printing device is a serial type printing device. A mechanical unit 420 is disposed in an exterior 401 of the printing device 400. Each ink container 411 of each main tank 410 (410k, 410c, 410m, or 410y) for each color of black (K), cyan (C), magenta (M), and yellow (Y) is made of a packing member, such as an aluminium laminate film. The ink container 411 is accommodated, for example, in a plastic housing container case 414. As a result, the main tank 410 is used as an ink cartridge of each color.

Meanwhile, a cartridge holder 404 is disposed on the rea side of the opening when a cover of the device main body 401c is opened. The main tank 410 is detachably mounted in the cartridge holder 404. As a result, each ink discharge outlet 413 of the main tank 410 is communicated to the discharge head 434 for each color via a supplying tube 436 for each color so that the ink can be discharged from the discharging head 434 to a print medium.

The printing device may include not only a portion discharging an ink but also a device referred to as a pre-processing device, a post-processing device, etc.

As an embodiment of the pre-processing device and the post-processing device, as in the case of the ink, such as black (K), cyan (C), magenta (M), and yellow (Y), there is an embodiment where a liquid container including a pre-processing fluid or a post-processing fluid and a liquid discharging head are added to discharge the pre-processing fluid or the post-processing fluid in an ink-jet recording system.

As another embodiment of the pre-processing device and the post-processing device, there is an embodiment where a pre-processing device and a post-processing device employing a blade coating method, a roll coating method, or a spray coating method, other than the ink-jet recording system.

How to use the ink is not limited to the ink-jet printing method and the ink can be widely used. Specific examples of such methods include, other than the ink-jet printing method, a blade coating methods, gravure coating methods, bar coating methods, roll coating methods, dip coating methods, curtain coating methods, slide coating methods, die coating methods, and spray coating methods.

Figure 3:
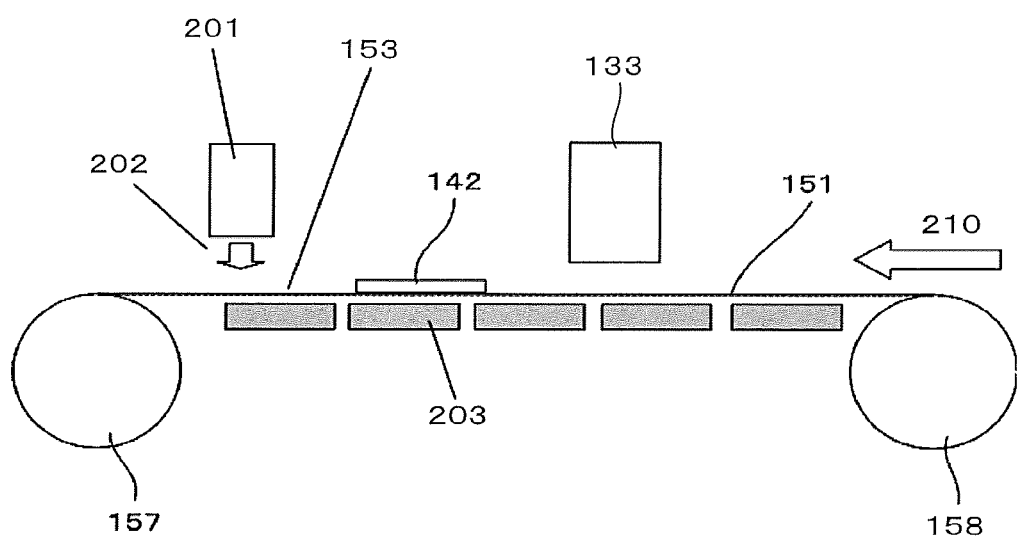
FIG. 3 is a schematic view illustrating one example of a heating unit of the ink-jet printing device.

FIG. 3 is a schematic view illustrating one example of a heating unit of the ink-jet printing device of FIG. 1 and FIG. 2. The heating unit of FIG. 3 is configured to blow hot air 202 from a heating fan 201 serving as a hot-air generating unit to an image formed on a substrate 142 transported on a conveyance belt 151 to dry the image.

Note that, a group of heaters 203 are disposed at an opposite side of the conveyance belt 151 to the side thereof where the substrate 142 is transported and therefore the substrate 142 to which the ink is applied can be heated. In FIGS. 3, 157 and 158 are conveying rollers serving as conveying units, and the arrow of 210 indicates a direction of conveyance.

(Print)

A print of the present disclosure includes a substrate including a resin, and the ink of the present disclosure or an ink in the set of an ink and a substrate of the present disclosure, where the ink is applied to the substrate. The print may be a print including, on the substrate, an image printed with the ink for use in the present disclosure. The print may be a building material including wall paper or floor materials, such as flooring materials, in which an ink is applied onto a substrate. Formation of the print means, not only to form an image having meanings, such as letters or shapes, onto a substrate, but also to form an image not having meanings (simply discharge droplets), such as a pattern, onto a substrate.

The print of the present disclosure includes, on a substrate, an image printed with an ink in the set of an ink and a substrate of the present disclosure.

As the substrate, a substrate similar onto a substrate in the set of an ink and a substrate can be used. The ink in the set of an ink and a substrate of the present disclosure can however provide an image having excellent coloring when the ink is applied for an impermeable substrate.

Moreover, the substrate may be a substrate (color substrate) to which a white ink is applied before applying a color ink at the time of color printing. A color of such a color substrate can be adjusted to white and coloring of the color ink can be improved.

Examples of the color substrate include colored paper, the film that is colored, colored cloth, colored clothes, and colored ceramic.

The ink may be applied not only to at least one surface of a flat substrate, but also to a surface of a three-dimensional object.

EXAMPLES

The present disclosure will be described in more detail by ways of the following Examples, but the present disclosure should not be construed as being limited to these Examples.

Preparation Example 1 of Resin Particles

<Preparation of Polycarbonate Polyurethane Resin Emulsion>

A reaction vessel equipped with a stirrer, a reflux condenser, and a thermometer was charged with 1,500 g of polycarbonate diol (reaction product of 1,6-hexanediol and dimethyl carbonate (number average molecular weight (Mn): 1,200)), 220 g of 2,2-dimethylol propionic acid (hereinafter may also be referred to as "DMPA"), and 1,347 g of N-methylpyrrolidone (hereinafter may also be referred to as "NMP") under a nitrogen gas stream, followed by heating to 60° C. to dissolve DMPA.

Then, 1,445 g of 4,4'-dicyclohexylmethane diisocyanate and 2.6 g of dibutyl tin dilaurate (catalyst) were added to the resultant, followed by heating to 90° C. to allow to urethanize for 5 hours, to obtain an isocyanate-terminated urethane prepolymer. Then, the resultant reaction mixture was cooled to 80° C. To the resultant, 149 g of triethylamine was added and mixed together, and a portion of the resultant mixture was taken out by 4,340 g and added to a mixed solution of 5,400 g of water and 15 g of triethylamine with strong stirring.

Then, 1,500 g of ice and 626 g of a 35% by mass solution of 2-methyl-1,5-pentanediamine in water were added to the resultant to allow for a chain elongation reaction. Solvents were distilled off so as to give a solid content of 30% by mass, to obtain a polycarbonate urethane resin emulsion 1.

The obtained polycarbonate urethane resin emulsion 1 was measured with "a filming temperature tester" (available from Imoto Machinery Co., Ltd.). As a result, a minimum filming temperature was 55° C.

Preparation Example 2 of Preparing Resin Particles

<Preparation of Polyether-Based Urethane Resin Emulsion>

A reaction was induced in a vessel equipped with a thermometer, a nitrogen gas introducing tube, and a stirrer and purged with nitrogen, using 100.2 parts by mass of polyether polyol ("PTMG1000" available from Mitsubishi Chemical Corporation, volume average molecular weight: 1,000), 15.7 parts by mass of 2,2-dimethylol propionic acid, 48.0 parts by mass of isophorone diisocyanate, 77.1 parts by mass of methyl ethyl ketone as an organic solvent, and 0.06 parts by mass of dibutyl tin dilaurate (may be referred to as "DMLTDL" hereinafter) as a catalyst.

The reaction was continued for 4 hours. Then, 30.7 parts by mass of methyl ethyl ketone as a dilute solution was supplied to further continue the reaction.

When a weight average molecular weight of the reaction product reached a range of 20,000 or greater but 60,000 or less, 1.4 parts by mass of methanol was supplied to terminate the reaction, to obtain an organic solvent solution of a urethane resin.

Thirteen point four parts by mass of a 48% by mass potassium hydroxide aqueous solution was added to the organic solvent solution of the urethane resin to neutralize carboxyl groups of the urethane resin. Then, 715.3 parts by mass of water was added, and the resultant was stirred sufficiently, aged, and desolventize, to obtain a polyether polyurethane resin emulsion 2 having a solid content of 30% by mass.

A minimum filming temperature of the obtained polyether urethane resin emulsion 2 measured in the same manner as in Preparation Example 1 for the polycarbonate polyurethane resin emulsion was 43° C.

Preparation Example 3 of Resin Particles

<Preparation of Polyester Urethane Resin Emulsion>

A polyester urethane resin emulsion 3 having a solid content of 30% by mass was obtained in the same manner as in Preparation Example 2 for preparing resin particles, except that the polyether polyol ("PTMG1000" available from Mitsubishi Chemical Corporation, volume average molecular weight: 1,000) used in Preparation Example 2 for preparing resin particles was changed to polyester polyol ("POLYLITE OD-X-2251" available from DIC Corporation, volume average molecular weight: 2,000).

A minimum filming temperature of the obtained polyester polyurethane resin emulsion 3 measured in the same manner as in Preparation Example 1 for the polycarbonate urethane resin emulsion was 74° C.

Preparation Example 1 of Pigment Dispersion Liquid

<Preparation of Black Pigment Dispersion Liquid>

A prescribed mixture of the followings was pre-mixed and subjected to circulation dispersion with a disk-type bead mill (KDL TYPE available from Shinmaru Enterprises Corporation, media used: zirconia balls with a diameter of 0.3 mm) for 7 hours, to obtain a black pigment dispersion liquid (with a pigment solid content of 15% by mass).

Carbon black pigment (product name: MONARCH 800 available from Cabot Corporation): 15 parts by mass Anionic surfactant (PIONINE A-51-B available from Takemoto Oil & Fat Co., Ltd.): 2 parts by mass Ion-exchanged water: 83 parts by mass Preparation Example 2 of Pigment Dispersion Liquid <Preparation of Cyan Pigment Dispersion Liquid>

A cyan pigment dispersion liquid (with a pigment solid content of 15% by mass) was obtained in the same manner as in Preparation Example 1 for preparing pigment dispersion liquid, except that the carbon black pigment used in Preparation Example 1 for preparing pigment dispersion liquid was changed to a Pigment blue 15:3 (product name: LIONOL BLUE FG-7351 available from Toyo Ink Co., Ltd.).

Preparation Example 3 of Pigment Dispersion Liquid

<Preparation of Magenta Pigment Dispersion Liquid>

A magenta pigment dispersion liquid (with a pigment solid content of 15% by mass) was obtained in the same manner as in Preparation Example 1 for preparing pigment dispersion liquid, except that the carbon black pigment used in Preparation Example 1 for preparing pigment dispersion liquid was changed to a Pigment red 122 (product name: TONER MAGENTA E002 available from Clariant (Japan) K.K.).

Preparation Example 4 of Pigment Dispersion Liquid

<Preparation of Yellow Pigment Dispersion Liquid>

A yellow pigment dispersion liquid (with a pigment solid content of 15% by mass) was obtained in the same manner as in Preparation Example 1 for preparing pigment dispersion liquid, except that the carbon black pigment used in Preparation Example 1 for preparing pigment dispersion liquid was changed to a Pigment yellow 74 (product name: FAST YELLOW 531 available from Dainichiseika Color & Chemicals Mfg. Co., Ltd.).

Preparation Example 5 of Pigment Dispersion Liquid

<Preparation of Black Pigment-Dispersed Resin Dispersion Liquid>

—Preparation of Polymer Solution A—

A 1 L flask equipped with a mechanical stirrer, a thermometer, a nitrogen gas introducing tube, a reflux condenser, and a dropping funnel was sufficiently internally purged with a nitrogen gas. Then, 11.2 g of styrene, 2.8 g of acrylic acid, 12.0 g of lauryl methacrylate, 4.0 g of polyethylene glycol methacrylate, 4.0 g of a styrene macromer (product name: AS-6 available from Toagosei Co., Ltd.), and 0.4 g of mercaptoethanol were mixed and heated to 65° C. in the flask. Then, a mixture solution of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of the styrene macromer mentioned above, 3.6 g of mercaptoethanol, 2.4 g of azobismethylvaleronitrile, and 18.0 g of methyl ethyl ketone was dropped into the flask in 2.5 hours. After the dropping, a mixture solution of 0.8 g of azobis methylvaleronitrile and 18.0 g of methyl ethyl ketone was dropped into the flask in 0.5 hours. After the resultant was aged at 65° C. for 1 hour, 0.8 g of azobis methylvaleronitrile was added and the resultant was further aged for 1 hour. After the reaction completed, 364.0 g of methyl ethyl ketone was added into the flask to obtain 800 g of a polymer solution A having a solid content of 50% by mass.

—Preparation of Black Pigment Dispersion Liquid—

Twenty-eight grams of the polymer solution A, 42 g of carbon black (FW100 available from Degussa Ag), 13.6 g of a 1 mol/L potassium hydroxide aqueous solution, 20 g of methyl ethyl ketone, and 13.6 g of water were stirred sufficiently and then kneaded with a roll mill. The obtained paste was put into 200 g of pure water, stirred sufficiently, and evacuated of methyl ethyl ketone and water by distillation with an evaporator. Then, to remove coarse particles, the resultant dispersion liquid was subjected to pressure filtration through a polyvinylidene fluoride membrane filter having an average pore diameter of 5.0 μm, to obtain a carbon black pigment-containing polymer particle dispersion having a pigment solid content of 15% by mass and a solid content of 20% by mass.

<Substrate>

A resin film having an average thickness of 0.5 mm was formed using the resin presented in Table 1 below by melt extrusion molding. The resultant resin film was used as a substrate to be printed.

TABLE 1

| No. | Polymer | trade name, supplier | $\partial_h$ | Fh |
|---|---|---|---|---|
| A | Polystyrene | Polystyrene LO, BASF | 4.3 | 14% |
| B | Poly methyl methacrylate | Rohm and Haas | 7.5 | 20% |
| C | Chlorinated polypropylene | Parlon ®P-10, Hercules | 5.4 | 17% |
| D | Saturated polyester | Desmophene ® 850, Bayer | 12.3 | 25% |
| E | Poly ethyl methacrylate | Lucite ® 2042, DuPont | 4.0 | 13% |
| F | Poly vinyl acetate | Mowilith ® 50, Hoechst | 9.6 | 23% |
| G | Poly vinyl chloride | Vilpa ® KR, k = 50, Montecatini | 8.3 | 24% |
| H | Poly isobutylene | Lutonal ® IC-123, BASF | 4.7 | 22% |
| I | Poly vinyl butyral | Butvar ® B-76, Shawnigan | 13.0 | 36% |

Example 1

<Production of Ink>

Twenty percent by mass of the black pigment dispersion liquid of Preparation Example 1 (with a pigment solid content of 15% by mass), 25% by mass of the polycarbonate-based urethane resin emulsion of Preparation Example 1 (with a solid content of 30% by mass), 12% by mass of 3-methoxy-N,N-dimethylpropionamide (product name: EQUAMIDE M-100 available from Idemitsu Kosan Co., Ltd.), 2% by mass of 1,2-propanediol (available from Tokyo Chemical Industry Co., Ltd.), 10% by mass of 1,2-butane diol (available from Tokyo Chemical Industry Co., Ltd.), 12% by mass of 2,3-butanediol (available from Tokyo Chemical Industry Co., Ltd.), 3% by mass of 2-ethylhexyl alcohol (available from Tokyo Chemical Industry Co., Ltd.), 0.1% by mass of an antiseptic with a product name: PROXEL LV (available from Arch Chemicals Japan, Inc.), 0.01% by mass of a fluorine-based surfactant (product name: UNIDYNE DSN-403N available from Daikin Industries, Ltd.), and a balance amount of highly pure water (100% by mass in total) were mixed and stirred, and then subjected to filtration through a polypropylene filter having an average pore diameter of 0.2 μm, to produce Ink No. 1.

Examples 2 to 10 and Comparative Examples 1 to 2

<Production of Ink>

Ink Nos. 2 to 12 were produced in the same manner as in Example 1, except that the composition and amounts used in Example 1 were changed to the composition and amounts presented in Table 2 to Table 4.

TABLE 2

| | | Ex. 1 | Ex. 2 | Ex. 3 | Ex. 4 | Ex. 5 |
|---|---|---|---|---|---|---|
| | Ink No. | 1 | 2 | 3 | 4 | 5 |
| Pigment dispersion liquid | Black pigment dispersion liquid of Preparation Ex. 1 | 20 | 20 | — | — | — |
| | Cyan pigment dispersion liquid of Preparation Ex. 2 | — | — | — | — | 20 |
| | Magenta pigment dispersion liquid of Preparation Ex. 3 | — | — | 20 | — | — |
| | Yellow pigment dispersion liquid of Preparation Ex. 4 | — | — | — | 20 | — |
| | Black pigment-dispersed resin dispersion liquid of Preparation Ex. 5 | — | — | — | — | — |
| Resin particles | Polycarbonate-based polyurethane resin emulsion 1 of Preparation Ex. 1 | 25 | — | — | 30 | — |
| | Polyether-based polyurethane resin emulsion 2 of Preparation Ex. 2 | — | 25 | — | — | 25 |
| | Polyester-based polyurethane resin emulsion 3 of Preparation Ex. 3 | — | — | 30 | — | — |

TABLE 2-continued

|  |  |  | Ex. 1 | Ex. 2 | Ex. 3 | Ex. 4 | Ex. 5 |
|---|---|---|---|---|---|---|---|
|  |  | Polyester resin emulsion (PESRESIN A-124GP, from Takamatsu Oil & Fat Co., Ltd.) | — | — | — | — | — |
|  |  | Ethylene/vinyl chloride-based copolymer emulsion (SUMIELITE 1210, from Sumika Chemtex Co., Ltd.) | — | — | — | — | — |
| Organic solvents | A | 3-Methoxy-N,N-dimethylpropionamide | 12 | 14 | — | — | — |
|  |  | 3-Butoxy-N,N-dimethylpropionamide | — | — | 16 | — | — |
|  |  | Diethylene glycol diethyl ether | — | — | — | 15 | — |
|  |  | Propylene 1,2 carbonate | — | — | — | — | 7.3 |
|  |  | 2-Pyrrolidone | — | — | — | — | — |
|  |  | 1-n-Octyl-2-pyrrolidone | — | — | — | — | — |
|  |  | 1,3-Dimethyl-2-imidazolidinone | — | — | — | — | — |
|  |  | Dimethyl sulphoxide | — | — | — | — | — |
|  |  | Diethylene glycol monobutyl ether | — | — | — | — | — |
|  | B | 1,2-Propanediol | 2 | 5 | 8 | — | 5 |
|  |  | 1,2-Butanediol | 10 | 5 | 4 | 5 | 5 |
|  |  | 2,3-Butanediol | 12 | 9 | 3 | 6 | 10 |
|  | C | 2-ethylhexyl alcohol | 3 | 2 | 1 | 4 | 2 |
| Antiseptic |  | PROXEL LV | 0.1 | 0.1 | 0.1 | 0.1 | 0.1 |
| Surfactant |  | Fluorine-based surfactant | 0.01 | 0.01 | 0.01 | 0.01 | 0.01 |
| Water |  | Ultra pure water | Balance | Balance | Balance | Balance | Balance |
|  |  | Total (% by mass) | 100 | 100 | 100 | 100 | 100 |

TABLE 3

|  |  |  | Ex. 6 | Ex. 7 | Ex. 8 | Ex. 9 | Ex. 10 |
|---|---|---|---|---|---|---|---|
|  |  | Ink No. | 6 | 7 | 8 | 9 | 10 |
| Pigment dispersion liquid |  | Black pigment dispersion liquid of Preparation Ex. 1 | — | 20 | 18 | — | 20 |
|  |  | Cyan pigment dispersion liquid of Preparation Ex. 2 | — | — | — | — | — |
|  |  | Magenta pigment dispersion liquid of Preparation Ex. 3 | — | — | — | 20 | — |
|  |  | Yellow pigment dispersion liquid of Preparation Ex. 4 | — | — | — | — | — |
|  |  | Black pigment-dispersed resin dispersion liquid of Preparation Ex. 5 | 22 | — | — | — | — |
| Resin particles |  | Polycarbonate-based polyurethane resin emulsion 1 of Preparation Ex. 1 | — | — | — | — | — |
|  |  | Polyether-based polyurethane resin emulsion 2 of Preparation Ex. 2 | — | — | — | — | 30 |
|  |  | Polyester-based polyurethane resin emulsion 3 of Preparation Ex. 3 | 25 | — | — | 30 | — |
|  |  | Polyester resin emulsion (PESRESIN A-124GP, from Tokamatsu Oil & Fat Co., Ltd.) | — | 30 | — | — | — |
|  |  | Ethylene/vinyl chloride-based copolymer emulsion (SUMIELITE 1210, from Sumika Chemtex Co., Ltd.) | — | — | 20 | — | — |
| Organic solvents | A | 3-Methoxy-N,N-dimethylpropionamide | — | — | — | — | — |
|  |  | 3-Butoxy-N,N-dimethylpropionamide | — | — | — | — | — |
|  |  | Diethylene glycol diethyl ether | — | — | — | — | — |
|  |  | Propylene 1,2 carbonate | — | — | — | — | — |
|  |  | 2-Pyrrolidone | 10 | — | — | — | — |
|  |  | 1-n-Octyl-2-pyrrolidone | — | 15 | — | — | — |
|  |  | 1,3-Dimethyl-2-imidazolidinone | — | — | 12 | — | — |
|  |  | Dimethyl sulphoxide | — | — | — | 12 | — |
|  |  | Diethylene glycol monobutyl ether | — | — | — | — | 18 |
|  | B | 1,2-Propanediol | — | 5 | 4 | — | — |
|  |  | 1,2-Butanediol | 11 | 5 | 5 | 8 | 5 |
|  |  | 2,3-Butanediol | 12 | 10 | 7 | 10 | 7 |
|  | C | 2-ethylhexyl alcohol | 0.5 | 3 | 2 | 5 | 1 |
| Antiseptic |  | PROXEL LV | 0.1 | 0.1 | 0.1 | 0.1 | 0.1 |
| Surfactant |  | Fluorine-based surfactant | 0.01 | 0.01 | 0.01 | 0.01 | 0.01 |
| Water |  | Ultra pure water | Balance | Balance | Balance | Balance | Balance |
|  |  | Total (% by mass) | 100 | 100 | 100 | 100 | 100 |

TABLE 4

|  |  | Comp. Ex. 1 | Comp. Ex. 2 |
|---|---|---|---|
|  | Ink No. | 11 | 12 |
| Pigment dispersion liquid | Black pigment dispersion liquid of Preparation Ex. 1 | 20 | 20 |
| Resin particles | Polycarbonate-based polyurethane resin emulsion 1 of Preparation Ex. 1 | 30 | 30 |
| Organic solvents | A 3-Methoxy-N,N-dimethylpropionamide | 10 | — |
|  | Isoamyl acetate | — | 10 |
|  | B 1,2-Propanediol | 10 | 12 |
|  | 1,3-Propanediol | 2 | 1 |
|  | 1,2-Butanediol | 2 | 1 |
|  | 2,3-Butanediol | 1 | 2 |
|  | C 2-ethylhexyl alcohol | — | — |
|  | D 2-Methyl-2,4-pentanediol | 2 | 2 |
|  | Dipropylene glycol monomethyl ether | 1 | 3 |
| Antiseptic | PROXEL LV | 0.1 | 0.1 |
| Surfactant | Fluorine-based surfactant | 0.01 | 0.01 |
| Water | Ultra pure water | Balance | Balance |
|  | Total (% by mass) | 100 | 100 |

—Resin Particles—
Polyester resin emulsion (PESRESIN A-124GP available from Takamatsu Oil & Fat Co., Ltd., with a solid content of 30% by mass)
Ethylene-vinyl chloride copolymer emulsion (SUMIELITE 1210 available from Sumika Chemtex Co., Ltd., with a solid content of 50% by mass)
—Organic Solvent A—
The details of Organic Solvent A were presented in Table 5 below.

TABLE 5

| No. | Solvent | Supplier | Fh (%) | Boiling point (° C.) |
|---|---|---|---|---|
| a | 3-Methoxy-N,N-dimethylpropionamide | Tokyo Chemical industry Co., Ltd. | 16% | 216 |
| b | 3-Butoxy-N,N-dimethyl propionamide | Tokyo Chemical industry Co., Ltd. | 17% | 180 |
| c | Diethylene glycol diethyl ether | Tokyo Chemical industry Co., Ltd. | 26% | 298 |
| d | Propylene 1,2 carbonate | Tokyo Chemical industry Co., Ltd. | 10% | 242 |
| e | 2-Pyrrolidone | Tokyo Chemical industry Co., Ltd. | 20% | 245 |
| f | 1-n-Octyl-2-pyrrolidone | Tokyo Chemical industry Co., Ltd. | 21% | 170 |
| g | 1,3-Dimethyl-2-imidazolidinone | Tokyo Chemical industry Co., Ltd. | 21% | 224 |
| h | Dimethyl sulphoxide | Tokyo Chemical industry Co., Ltd. | 23% | 189 |
| i | Dimethyl glycol monobutyl ether | Tokyo Chemical industry Co., Ltd. | 32% | 230 |
| j | Isoamyl acetate | Tokyo Chemical industry Co., Ltd. | 28% | 142 |

—Organic Solvent B—
1,2-Propanediol (available from Tokyo Chemical Industry Co., Ltd., δH: 13.8 MPa$^{1/2}$, Fh: 35%, boiling point: 188° C.)
1,3-Propanediol (available from Tokyo Chemical Industry Co., Ltd., δH: 14.0 MPa$^{1/2}$, Fh: 38%, boiling point: 211° C.)
1,2-Butanediol (available from Tokyo Chemical Industry Co., Ltd., δH: 19.2 MPa$^{1/2}$, Fh: 43%, boiling point: 191° C.)
2,3-Butanediol (available from Tokyo Chemical Industry Co., Ltd., δH: 18.3 MPa$^{1/2}$, Fh: 43%, boiling point: 178° C.)
—Organic Solvent C—
2-ethylhexyl alcohol (available from Tokyo Chemical Industry Co., Ltd., δH: 10.3 MPa$^{1/2}$, Fh: 34%, boiling point: 185° C.)
—Organic Solvent D—
2-Methyl-2,4-pentanediol (available from Tokyo Chemical Industry Co., Ltd., δH: 15.0 MPa$^{1/2}$, Fh: 39%, boiling point: 197° C.)
Dipropylene glycol monomethyl ether (available from Tokyo Chemical Industry Co., Ltd., δH: 10.8 MPa$^{1/2}$, Fh: 31%, boiling point: 190° C.)
Fluorine-based surfactant (UNIDYNE DSN-403N available from Daikin Industries, Ltd.)
Antiseptic (PROXEL LV available from Arch Chemicals Japan, Inc.)
<Image Formation>
An ink-jet printer (device name: a modified device of IPSiO GXe5500 available from Ricoh Company Limited) was charged with each of the obtained inks Nos. 1 to 12 and a solid image was printed with each ink on a substrate presented in Table 6. After printing, the solid image was dried for 1 hour on a hot plate (NINOS ND-1, available from As One Corporation) set to a drying temperature presented in Table 6.

Note that, the modified device of IPSiO GXe5500 was prepared by modifying IPSiO GXe5500 in a manner that printing equivalent to printing speed of 30 m$^2$/hr with a printing width of 150 cm could be reproduced with an A4 size. Moreover, the device was modified by disposing the hot plate so that heating conditions (a heating temperature and a heating duration) after printing could be varied.

Next, "discharging reliability," "fixability (beading)," "non-transfer properties," and "scratch resistance" were evaluated in the following manner. The results are presented in Table 7.

Note that, very severe evaluation criteria was applied for the evaluations of "fixability (beading)," "non-transfer properties," and "scratch resistance" compared to a case of printing on typical paper, in view of application to outdoor use.
<Discharging Reliability>
Discharging reliability was evaluated by means of the ink-jet printer (a modified device of IPSiO GXe5500, available from Ricoh Company Limited).

First, an ink-jet printer (device name: IPSiO GXe5500, available from Ricoh Company Limited) was charged with each of the obtained inks Nos. 1 to 12 and a nozzle check pattern was printed on a substrate presented in Table 6 to confirm whether "nozzle omission" occurred. Thereafter, the ink-jet printer was left to stand for 12 hours. After leaving the ink-jet printer for 12 hours, a nozzle check pattern was printed without performing cleaning maintenance. The number of "nozzle omission" occurred was counted and "discharging reliability" was evaluated based on the following evaluation criteria. The evaluation result of B or higher is desirable on practical use. Note that, the term "nozzle omission" means that the ink was not discharged and an ink image was not formed regularly.
[Evaluation Criteria]
A: The number of areas nozzle omission occurred was 1 or less.
B: The number of areas nozzle omission occurred was greater than 1 but 2 or less.
C: The number of areas nozzle omission occurred was greater than 2 but 4 or less.
D: The number of areas nozzle omission occurred was 5 or greater.
<Fixability (Beading)>
Printing unevenness of each of the produced solid images was visually observed and "fixability (beading)" was evaluated based on the following evaluation criteria. The evaluation result of B or higher is desirable on practical use.
[Evaluation Criteria]
A: very good (no beading at all)
B: good (beading was slightly observed)
C: normal (there was beading)
D: poor (there was significant beading)

A: Slight scratches were remained when the image was rubbed 50 times, but the image density was not affected.

B: The image density reduced when the image was rubbed 31 times or more but 50 times or less.

C: The image density reduced when the image rubbed 30 times or less.

TABLE 6

| | Ink | | | | | |
|---|---|---|---|---|---|---|
| | | Organic solvent A | | Substrate | | Absolute value of | Drying temperature |
| | Type | Fha (%) | Boiling point (° C.) | Type | Fhb of resin (%) | difference (Fha − Fhb) (%) | of printed image (° C.) |
| Ex. 1 | 1 | 16 | 216 | A | 14 | 2 | 80 |
| Ex. 2 | 2 | 16 | 216 | B | 20 | 4 | 75 |
| Ex. 3 | 3 | 17 | 180 | C | 17 | 0 | 90 |
| Ex. 4 | 4 | 26 | 298 | D | 25 | 1 | 70 |
| Ex. 5 | 5 | 10 | 242 | E | 13 | 3 | 80 |
| Ex. 6 | 6 | 20 | 245 | F | 23 | 3 | 85 |
| Ex. 7 | 7 | 21 | 170 | G | 24 | 3 | 70 |
| Ex. 8 | 8 | 21 | 224 | H | 22 | 1 | 70 |
| Ex. 9 | 9 | 23 | 189 | B | 20 | 3 | 80 |
| Ex. 10 | 10 | 32 | 230 | I | 36 | 4 | 80 |
| Comp. Ex. 1 | 11 | 16 | 216 | D | 25 | 9 | 80 |
| Comp. Ex. 2 | 12 | 28 | 142 | B | 20 | 8 | 80 |

<Non-Transfer Properties>

Two sheets were each cut into a size of 3 cm×3 cm where each of the solid images was formed on each sheet. The 2 sheets were overlapped in a manner that the solid images were to be in contact with each other and pressure of 1.0 MPa was applied to the stack 2 sheets by a press machine for 10 seconds. Thereafter, the 2 sheets of the evaluation samples were peeled and easiness of peeling and the presence of any damage in the images after peeling was visually observed. Then, "non-transfer properties" were evaluated based on the following evaluation criteria. The evaluation result of B or higher is desirable on practical use.
[Evaluation Criteria]
A: When the solid images of the 2 sheets were peeled from one another, no sticking feel was not felt, the solid images were peeled naturally, and no color transfer to both substrates was observed.
B: When the solid images of the 2 sheets were peeled from one another, sticking feel was slightly felt but there was no damage in the images.
C: When the solid images of the 2 sheets were peeled from one another, sticking feel was felt and a damage was slightly observed in the images.
D: When the solid images of the 2 sheets were peeled from one another, sticking feel was strong and a damage in the images was significant.
<Scratch Resistance>

Each of the formed solid images was rubbed with a dry cotton cloth (No. 3 calico) with applying load of 400 g, a state of the image was visually observed, and "scratch resistance" was evaluated based on the following evaluation criteria. The evaluation result of B or higher is preferable on practical use.
[Evaluation Criteria]
AA: There was no change in the image even after rubbing 50 times or more.

TABLE 7

| | Fixability (beading) | Non-transfer properties | Scratch resistance | Discharging reliability |
|---|---|---|---|---|
| Ex. 1 | A | A | AA | A |
| Ex. 2 | B | A | A | A |
| Ex. 3 | A | A | AA | A |
| Ex. 4 | A | B | A | A |
| Ex. 5 | B | A | A | A |
| Ex. 6 | A | A | A | B |
| Ex. 7 | B | A | A | A |
| Ex. 8 | A | A | A | A |
| Ex. 9 | A | A | AA | A |
| Ex. 10 | B | A | B | B |
| Comp. Ex. 1 | D | C | C | B |
| Comp. Ex. 2 | C | A | C | D |

It was found from the results of Tables 6 and 7 that in Examples 1, 3, and 9, fixability over the impermeable substrate was very good and beading did not occur when high-speed printing was performed, the image having excellent scratch resistance and non-transfer properties was obtained, and high discharging reliability was obtained.

In Example 2, the result of fixability was slightly inferior to the result of Example 1 because the difference between Fh of the organic solvent A added for improving fixability and Fh of the resin of the substrate was slightly large.

In Example 4, the result of non-transfer properties was slightly inferior to the result of Example 1 because the boiling point of the organic solvent A added for improving fixability was slightly high.

Example 5 was an example where the amount of the organic solvent A added for improving fixability was slightly small, and in Example 5, the result of fixability was slightly inferior to the result of Example 1.

Example 6 was an example where the amount of 2-ethylhexyl alcohol added was slightly small, and in Example 6, the result of discharging reliability was slightly inferior to the result of Example 1.

Example 7 was an example where the polyester resin particles were used, and in Example 7, the result of scratch resistance was slightly inferior to the result of Example 1 where the polyurethane resin particles were used.

Example 8 was an example where ethylene/vinyl chloride-based copolymer resin particles were used, and in Example 8, the result of scratch resistance was slightly inferior to the result of Example 1 where the polyurethane resin particles were used.

Example 10 was an example where the difference of Fh of the organic solvent added for improving fixability and Fh of the resin of the substrate was slightly large and the amount of 2-ethylhexyl alcohol added was slightly small, and in Example 10, the results of fixability, scratch resistance, and discharging reliability were slightly inferior to the results of Example 1.

On the other hand, Comparative Examples 1 and 2 were examples where as an organic solvent, the compound where the compound had a boiling point of 170° C. or higher and an absolute value of a difference between the ratio Fh of the organic solvent represented by Mathematical Formula 1 and the ratio Fh of the resin of the substrate represented by Mathematical Formula 1 was 5% or less, was not included. In Comparative Example 1, the results of fixability, non-transfer properties, scratch resistance, and discharging reliability were inferior to the results of Example 1. In Comparative Example 2, the results of fixability, scratch resistance, and discharging reliability were inferior to the results of Example 1.

Solvent-based inks available in the art have excellent fixability over impermeable substrate because fixing is performed while swelling an impermeable substrate with organic solvents in an ink. However, the solvent-based inks have problems that fixability of an ink coating film onto a substrate is sufficient and high-speed printability is poor because a final print has a structure where the ink coating film is simply placed on the substrate.

Considering outdoor use, moreover, desired characteristics are scratch resistance of a print that is as resilient as a print of indoor use, solvent resistance, image hardness, etc. However, the water-based ink has a problem that sufficient characteristics comparable to characteristics of solvent-based inks have not been obtained.

Furthermore, improvements are desired in non-transfer properties for preventing color transfer or damages of an image when images are overlapped with one another.

It was found from the evaluation results that the inks of Examples 1 to 10 were suitable for outdoor use. Moreover, it was found that the inks of Examples 1 to 10 had fixability over impermeable substrates, scratch resistance, non-transfer properties, and discharging reliability that stood comparison with solvent-based inks in the art.

Experimental Example

<Influence of Heating Conditions>

Fixability, non-transfer properties, and scratch resistance were evaluated in the same manner as in Example 1, except that heating conditions (a heating temperature and a heating duration) after printing were changed as presented in No. 1 to No. 8 of Table 8 below in the combination of the ink of Example 1 and the substrate A. The results are presented in Table 8.

Note that, No. 8 used a combination of the ink of Example 1 and the substrate A, printing of a solid image was performed in the same manner as in Example 1, heating after printing was not performed, and the image was dried by leaving to stand for 24 hours at 25° C.

TABLE 8

| | No. 1 | No. 2 | No. 3 | No. 4 | No. 5 | No. 6 | No. 7 | No. 8 |
|---|---|---|---|---|---|---|---|---|
| Heating temperature | 80° C. | 70° C. | 75° C. | 85° C. | 90° C. | 80° C. | 80° C. | NA |
| Heating duration | 1 h | 1 h | 1 h | 1 h | 1 h | 10 min | 30 min | NA |
| Fixability | A | A | A | A | A | A | A | A |
| Non-transfer properties | A | A | A | A | A | A | A | B |
| Scratch resistance | AA | AA | AA | AA | AA | A | AA | B |

For example, aspects of the present disclosure are as follows.

<1> An ink including:
water;
organic solvents;
a color material; and
resin particles,
wherein the ink is used in a printing method including applying the ink onto a substrate including a resin to perform printing, and
the organic solvents include a compound, a diol compound including 3 or 4 carbon atoms, and 2-ethylhexyl alcohol, where the compound has a boiling point of 170° C. or higher and an absolute value of a difference between a ratio Fh of the compound represented by Mathematical Formula 1 below and a ratio Fh of the resin in the substrate represented by Mathematical Formula 1 below is 5% or less, $$Fh(\%)=[\delta H/(\delta D+\delta P+\delta H)]\times 100 \quad \text{<Mathematical Formula 1>}$$

where, in Mathematical Formula 1, δH is a hydrogen bond term of the Hansen solubility parameter, δD is a dispersion term of the Hansen solubility parameter, and δP is a polarity term of the Hansen solubility parameter.

<2> The ink according to <1>,
wherein the diol compound including 3 or 4 carbon atoms is at least one selected from the group consisting of 1,2-propanediol, 1,2-butanediol, and 2,3-butanediol.

<3> The ink according to <1> or <2>,
wherein an amount of the compound is 10% by mass or greater relative to a total amount of the organic solvents, where the compound has a boiling point of 170° C. or higher and an absolute value of a difference between the ratio Fh of the compound represented by Mathematical Formula 1 and the ratio Fh of the resin in the substrate represented by Mathematical Formula 1 is 5% or less.

<4> The ink according to any one of <1> to <3>, wherein an amount of the compound is 30% by mass or greater relative to a total amount of the organic solvents, where the compound has a boiling point of 170° C. or higher and an absolute value of a difference between the ratio Fh of the compound represented by Mathematical Formula 1 and the ratio Fh of the resin in the substrate represented by Mathematical Formula 1 is 5% or less.

<5> The ink according to any one of <1> to <4>, wherein an amount of the 2-ethylhexyl alcohol is 1% by mass or greater relative to a total amount of the organic solvents.

<6> The ink according to any one of <1> to <5>, wherein boiling points of the organic solvents are 170° C. or higher but lower than 250° C.

<7> The ink according to any one of <1> to <6>, wherein a total amount of the organic solvents is 20% by mass or greater but 70% by mass or less.

<8> The ink according to any one of <1> to <7>, wherein the resin particles include polyurethane resin particles.

<9> The ink according to any one of <1> to <8>, wherein an amount of the resin particles is 1% by mass or greater but 15% by mass or less.

<10> The ink according to any one of <1> to <9>, wherein a volume average particle diameter of the resin particles is 10 nm or greater but 1,000 nm or less.

<11> The ink according to any one of <1> to <10>, wherein the color material is a pigment.

<12> The ink according to any one of <1> to <11>, wherein the substrate is an impermeable substrate including a resin at a surface of the impermeable substrate.

<13> An ink-jet printing method including:
applying stimuli to the ink according to any one of <1> to <12> to discharge the ink to apply the ink onto the substrate including a resin.

<14> The ink-jet printing method according to <13>, further including heating the substrate to which an image is printed.

<15> An ink-jet printer including:
an ink discharging unit configured to apply stimuli to the ink according to any one of <1> to <12> to discharge the ink to apply the ink onto the substrate including a resin.

<16> The ink-jet printer according to <15>, further including a heating unit configured to heat the substrate to which an image is printed.

<17> A print including:
a substrate including a resin; and
a printed layer disposed on the substrate,
wherein the printed layer includes organic solvents, a color material, and a resin, and
the organic solvents include a compound, a diol compound including 3 or 4 carbon atoms, and 2-ethylhexyl alcohol, where the compound has a boiling point of 170° C. or higher and an absolute value of a difference between a ratio Fh of the compound represented by Mathematical Formula 1 below and a ratio Fh of the resin in the substrate represented by Mathematical Formula 1 below is 5% or less, $$Fh(\%) = [\delta H/(\delta D + \delta P + \delta H)] \times 100 \qquad \text{<Mathematical Formula 1>}$$

where, in Mathematical Formula 1, $\delta H$ is a hydrogen bond term of the Hansen solubility parameter, $\delta D$ is a dispersion term of the Hansen solubility parameter, and $\delta P$ is a polarity term of the Hansen solubility parameter.

<18> A set of an ink and a substrate, the set including:
an ink including water, organic solvents, a color material, and resin particles; and
a substrate including a resin,
wherein the ink includes, as the organic solvents, a compound, a diol compound including 3 or 4 carbon atoms, and 2-ethylhexyl alcohol, where the compound has a boiling point of 170° C. or higher and an absolute value of a difference between a ratio Fh of the compound represented by Mathematical Formula 1 below and a ratio Fh of the resin in the substrate represented by Mathematical Formula 1 below is 5% or less, $$Fh(\%) = [\delta H/(\delta D + \delta P + \delta H)] \times 100 \qquad \text{<Mathematical Formula 1>}$$

where, in Mathematical Formula 1, $\delta H$ is a hydrogen bond term of the Hansen solubility parameter, $\delta D$ is a dispersion term of the Hansen solubility parameter, and $\delta P$ is a polarity term of the Hansen solubility parameter.

<19> The set of an ink and a substrate according to <18>, wherein the diol compound including 3 or 4 carbon atoms is at least one selected from the group consisting of 1,2-propanediol, 1,2-butanediol, and 2,3-butanediol.

<20> The set of an ink and a substrate according to <18> or <19>,
wherein an amount of the compound is 10% by mass or greater relative to a total amount of the organic solvents, where the compound has a boiling point of 170° C. or higher and an absolute value of a difference between the ratio Fh of the compound represented by Mathematical Formula 1 and the ratio Fh of the resin in the substrate represented by Mathematical Formula 1 is 5% or less.

<21> The set of an ink and a substrate according to any one of <18> to <20>,
wherein an amount of the compound is 30% by mass or greater relative to a total amount of the organic solvents, where the compound has a boiling point of 170° C. or higher and an absolute value of a difference between the ratio Fh of the compound represented by Mathematical Formula 1 and the ratio Fh of the resin in the substrate represented by Mathematical Formula 1 is 5% or less.

<22> The set of an ink and a substrate according to any one of <18> to <21>,
wherein an amount of the 2-ethylhexyl alcohol is 1% by mass or greater relative to a total amount of the organic solvents.

<23> The set of an ink and a substrate according to any one of <18> to <22>,
wherein boiling points of the organic solvents are 170° C. or higher but lower than 250° C.

<24> The set of an ink and a substrate according to any one of <18> to <23>,
wherein a total amount of the organic solvents is 20% by mass or greater but 70% by mass or less.

<25> The set of an ink and a substrate according to any one of <18> to <24>,
wherein the resin particles include polyurethane resin particles.

<26> The set of an ink and a substrate according to any one of <18> to <25>,
wherein an amount of the resin particles is 1% by mass or greater but 15% by mass or less.

<27> The set of an ink and a substrate according to any one of <18> to <26>,
wherein a volume average particle diameter of the resin particles is 10 nm or greater but 1,000 nm or less.

<28> The set of an ink and a substrate according to any one of <18> to <27>,
wherein the color material is a pigment.

<29> The set of an ink and a substrate according to any one of <18> to <27>,
wherein the substrate is an impermeable substrate including a resin at a surface of the impermeable substrate.
<30> An ink stored container including:
a container; and
the ink according to any one of <1> to <12> or an ink of the set of an ink and a substrate according to any one of <18> to <29>, where the ink is stored in the container.

The ink according to any one of <1> to <12>, the ink-jet printing method according to <13> or <14>, the ink-jet printer according to <15> or <16>, the print according to <17>, the set of an ink and a substrate according to any one of <18> to <29>, and the ink stored container according to <30> can solve the above-mentioned various problems existing in the art and can achieve the object of the present disclosure.

What is claimed is:

1. An ink comprising:
water;
organic solvents;
a color material; and
resin particles,
wherein
the ink is suitable for a printing method wherein the ink is applied onto a substrate having a surface resin, the organic solvents, comprise:
a diol compound including 3 or 4 carbon atoms,
2-ethylhexyl alcohol, and
a compound which has a boiling point of 170° C. or higher selected from the group consisting of 3-methoxy-N,N-dimethylpropionamide, 3-butoxy-N,N-dimethylpropionamide, diethylene glycol diethyl ether, dibenzyl ether, tetramethylurea, 2-pyrrolidone, 1-n-octyl-2-pyrrolidone, 1,3-dimethyl-2-imidazolidinone, propylene 1,2 carbonate, dimethyl sulphoxide and diethylene glycol monoether;
wherein the compound is selected such that an absolute value of a difference between a ratio Fh of the compound represented by Mathematical Formula 1 below and a ratio Fh of the resin in the substrate represented by Mathematical Formula 1 below is 5% or less, $Fh(\%)=[\mu H/(\mu D+\mu P+\mu H)]\times 100$ <Mathematical Formula 1> where, in Mathematical Formula 1, δH is a hydrogen bond term of the Hansen solubility parameter, δD is a dispersion term of the Hansen solubility parameter, and δP is a polarity term of the Hansen solubility parameter.

2. The ink according to claim 1,
wherein the diol compound including 3 or 4 carbon atoms is at least one selected from the group consisting of 1,2-propanediol, 1,2-butanediol, and 2,3-butanediol.

3. The ink according to claim 1,
wherein an amount of the compound is 10% by mass or greater relative to a total amount of the organic solvents.

4. The ink according to claim 1,
wherein an amount of the compound is 30% by mass or greater relative to a total amount of the organic solvents.

5. The ink according to claim 1,
wherein an amount of the 2-ethylhexyl alcohol is 1% by mass or greater relative to a total amount of the organic solvents.

6. The ink according to claim 1,
wherein the boiling points of the organic solvents are 170° C. or higher but lower than 250° C.

7. The ink according to claim 1,
wherein the resin particles comprise polyurethane resin particles.

8. An ink-jet printing method comprising:
applying stimuli to the ink according to claim 1 to discharge the ink to apply the ink onto the substrate including a resin.

9. An ink-jet printer comprising:
an ink discharging unit configured to apply stimuli to the ink according to claim 1 to discharge the ink to apply the ink onto the substrate including a resin.

10. A print comprising:
a substrate including a resin; and
a printed layer disposed on the substrate,
wherein the printed layer comprises the ink according to claim 1.

11. A set of an ink and a substrate, the set comprising:
an ink according to claim 1; and
a substrate including a resin.

12. A method to produce an ink for a substrate surface coated with a resin, comprising:
preparing a mixture comprising:
water;
organic solvents;
a color material; and
resin particles,
wherein
the organic solvents, comprise:
a diol compound including 3 or 4 carbon atoms,
2-ethylhexyl alcohol, and
a compound which has a boiling point of 170° C. or higher selected such that an absolute value of a difference between a ratio Fh of the compound represented by Mathematical Formula 1 below and a ratio Fh of the resin of the substrate represented by Mathematical Formula 1 is 5% or less, $Fh(\%)=[\delta H/(\delta D+\delta P+\delta H)]\times 100$ <Mathematical Formula 1> where, in Mathematical Formula 1, δH is a hydrogen bond term of the Hansen solubility parameter, δD is a dispersion term of the Hansen solubility parameter, and δP is a polarity term of the Hansen solubility parameter.

* * * * *